(12) United States Patent
Coates et al.

(10) Patent No.: US 6,867,834 B1
(45) Date of Patent: Mar. 15, 2005

(54) OPTICAL COMPENSATOR FOR LCD INCLUDING STACKED FILMS OF ONLY ONE O-PLATE, ONE A-PLATE AND TWO NEGATIVE C-PLATE RETARDERS

(75) Inventors: David Coates, Dorset (GB); Tara Cutler, Dorset (GB); Owain Llyr Parri, Dorset (GB); Mark Verrall, Dorset (GB); Peter Le Masurier, Dorset (GB); Stephan Derow, Muehltal (DE)

(73) Assignee: Merck Patent GmbH, Darmstadt (DE)

( * ) Notice: Subject to any disclaimer, the term of this patent is extended or adjusted under 35 U.S.C. 154(b) by 72 days.

(21) Appl. No.: 10/088,357
(22) PCT Filed: Sep. 13, 2000
(86) PCT No.: PCT/EP00/08932
§ 371 (c)(1), (2), (4) Date: Mar. 18, 2002
(87) PCT Pub. No.: WO01/20392
PCT Pub. Date: Mar. 22, 2001

(30) Foreign Application Priority Data

Sep. 16, 1999 (EP) .............................................. 99117980

(51) Int. Cl.[7] ............................................ G02F 1/1335
(52) U.S. Cl. ........................ 349/119; 349/117; 349/120
(58) Field of Search .................................. 349/117, 119, 349/120

(56) References Cited

U.S. PATENT DOCUMENTS

| | | | | |
|---|---|---|---|---|
| 5,504,603 A | * | 4/1996 | Winker et al. ............... | 349/117 |
| 5,528,400 A | | 6/1996 | Arakawa | |
| 5,612,801 A | * | 3/1997 | Winker ....................... | 349/119 |
| 5,619,352 A | | 4/1997 | Gunning, III et al. | |
| 5,895,106 A | * | 4/1999 | VanderPloeg et al. ...... | 349/120 |
| 5,986,734 A | * | 11/1999 | Winker et al. ............... | 349/123 |
| 5,995,184 A | * | 11/1999 | Chung et al. ............... | 349/118 |
| 6,266,114 B1 | * | 7/2001 | Skarohlid .................... | 349/119 |
| 6,320,634 B1 | * | 11/2001 | Winker et al. ............... | 349/117 |
| 2002/0089629 A1 | * | 7/2002 | Kim et al. ................... | 349/117 |
| 2002/0187283 A1 | * | 12/2002 | Gu et al. ..................... | 428/1.2 |

FOREIGN PATENT DOCUMENTS

| | | |
|---|---|---|
| EP | 0576342 A | 12/1993 |
| EP | 0 838 713 A | 4/1998 |
| WO | WO 96 10772 A | 4/1996 |
| WO | WO 97 44703 A | 11/1997 |

* cited by examiner

*Primary Examiner*—Tarifur R. Chowdhury
(74) *Attorney, Agent, or Firm*—Millen, White, Zelano, Branigan, P.C.

(57) ABSTRACT

An optical compensator for liquid crystal displays comprising at least one O plate retarder, at least one low tilt A plate retarder, and at least one negative C plate retarder is described. Also described are liquid crystal displays comprising such a compensator.

18 Claims, 13 Drawing Sheets

OPTICAL COMPENSATOR FOR LCD INCLUDING STACKED FILMS OF ONLY ONE O-PLATE, ONE A-PLATE AND TWO NEGATIVE C-PLATE RETARDERS

FIELD OF THE INVENTION

The invention relates to an optical compensator for liquid crystal displays and to a liquid crystal display comprising such a compensator.

BACKGROUND AND PRIOR ART

Optical compensators are used to improve the optical properties of liquid crystal displays (LCD), such as the contrast ratio and the grey scale representation at large viewing angles. For example in uncompensated displays of the TN or STN type at large viewing angles often a change of the grey levels and even grey scale inversion, as well as a loss of contrast and undesired changes of the colour gamut are observed.

An overview of the LCD technology and the principles and methods of optical compensation of LCDs is given in U.S. Pat. No. 5,619,352, the entire disclosure of which is incorporated into this application by way of reference.

As described in U.S. Pat. No. 5,619,352, to improve the contrast of a display at wide viewing angles a negatively birefringent C-plate compensator can be used, however, such a compensator does not improve the greyscale representation of the display. On the other hand, to suppress or even eliminate grey scale inversion and improve the grey scale stability U.S. Pat. No. 5,619,352 suggests to use a birefringent O-plate compensator. An O-plate compensator as described in U.S. Pat. No. 5,619,352 includes an O-plate, and may additionally include one or more A-plates and/or negative C-plates.

The terms 'O-plate', 'A-plate' and 'C-plate' as used in U.S. Pat. No. 5,619,352 and throughout this invention have the following meanings. An 'O-plate' is an optical retarder utilizing a layer of a positively birefringent (e.g. liquid crystal) material with its principal optical axis oriented at an oblique angle with respect to the plane of the layer. An 'A-plate' is an optical retarder utilizing a layer of uniaxially birefringent material with its extraordinary axis oriented parallel to the plane of the layer, and its ordinary axis (also called 'a-axis') oriented perpendicular to the plane of the layer, i.e. parallel to the direction of normally incident light. A 'C-plate' is an optical retarder utilizing a layer of a uniaxially birefringent material with its extraordinary axis (also called 'c-axis') perpendicular to the plane of the layer, i.e. parallel to the direction of normally incident light.

As an O-plate retarder for example an optical retardation film (hereinafter abbreviated as ORF) comprising a layer of a liquid crystal or mesogenic material with tilted or splayed structure can be used.

As an A-plate retarder for example a uniaxially stretched polymer film, like for example a stretched polyvinylalcohol (PVA) or polycarbonate (PC) film, can be used. Alternatively, an A-plate retarder may comprise for example a layer of a positively birefringent liquid crystal or mesogenic material with planar orientation.

As a negatively birefringent C-plate retarder for example a uniaxially compressed polymer film can be used. Alternatively, a negatively birefringent C-plate may comprise for example a layer of a liquid crystal or mesogenic material with a planar orientation and a negative birefringence. Typical examples of negatively birefringent liquid crystal materials are various kinds of discotic liquid crystal compounds.

In addition to U.S. Pat. No. 5,619,352, optical compensators comprising one or more O plates are described in prior art in WO 97/44409, WO 97/44702, WO 97/44703 and WO 98/12584, the entire disclosure of which is incorporated into this application by way of reference. WO 97/44703 and WO 98/12584 further suggest to use O plates in combination with a A plate. WO 97/44703 reports that the use of a compensator comprising a O plate in combination with a A plate, wherein the principal optical axes of both ORFs are oriented at right angles to each other, allows particularly good compensation of a TN-LCD, as it simultaneously reduces the angle dependence of the contrast and the grey scale inversion in the display.

However, when using compensators as described in the above mentioned prior art in combination with liquid crystal displays, especially TN or STN-displays, the improvements of the optical properties of the display, like contrast at wide viewing angles, grey scale level stability, and suppression of grey scale inversion, are still far from sufficient for most applications.

Therefore, it is desirable to have available improved optical compensators to further improve the optical performance of LCDs.

Definition of Terms

In connection with optical polarization, compensation and retardation layers, films or plates as described in the present application, the following definitions of terms as used throughout this application are given.

For the sake of simplicity, the term 'liquid crystal material' is used hereinafter for both liquid crystal materials and mesogenic materials, and the term 'mesogen' is used for the mesogenic groups of the material.

The terms 'tilted structure' or 'tilted orientation' means that the optical axis of the film is tilted at an angle θ between 0 and 90 degrees relative to the film plane.

The term 'splayed structure' or 'splayed orientation' means a tilted orientation as defined above, wherein the tilt angle additionally varies monotonuously in the range from 0 to 90° preferably from a minimum to a maximum value, in a direction perpendicular to the film plane.

The term 'low tilt structure' or 'low tilt orientation' means that the optical axis of the film is slightly tilted or splayed as described above, with the average tilt angle throughout the film being between 1 and 10°.

The term 'planar structure' or 'planar orientation' means that the optical axis of the film is substantially parallel to the film plane. This definition also includes films wherein the optical axis is slightly tilted relative to the film plane, with an average tilt angle throughout the film of up to 1°, and which exhibit the same optical properties as a film wherein the optical axis is exactly parallel, i.e. with zero tilt, to the film plane.

The term 'helically twisted structure' relates to a film comprising one or more layers of liquid crystal material wherein the mesogens are oriented with their main molecular axis in a preferred direction within molecular sublayers, with this preferred orientation direction in different sublayers being twisted around a helix axis that is substantially perpendicular to the film plane, i.e. substantially parallel to the film normal. This definition also includes orientations where the helix axis is tilted at an angle of up to 2° relative to the film normal.

The term 'homeotropic structure' or 'homeotropic orientation' means that the optical axis of the film is substantially perpendicular to the film plane, i.e. substantially parallel to the film normal. This definition also includes films wherein the optical axis is slightly tilted at an angle of up to 2° relative to the film normal, and which exhibit the same optical properties as a film wherein the optical axis is exactly parallel, i.e. with no tilt, to the film normal.

For sake of simplicity, an optical film with a tilted, splayed, low tilted, planar, twisted and homeotropic orientation or structure is hereinafter being shortly referred to as 'tilted film', 'splayed film', 'low tilt film', 'planar film', 'twisted film' and 'homeotropic film', respectively.

Throughout this invention, both a tilted and a splayed film will also be referred to as 'O plate'. A planar film will also be referred to as 'A plate' or 'planar A plate'. A low tilt film will also be referred to as 'low tilt A plate'. A twisted film will also be referred to as 'twisted A plate'.

The average tilt angle $\theta_{ave}$ is defined as follows $$\theta_{ave} = \frac{\sum_{d'=0}^{d} \theta'(d')}{d}$$

wherein $\theta'(d')$ is the local tilt angle at the thickness d' within the film, and d is the total thickness of the film.

The tilt angle of a splayed film hereinafter is given as the average tilt angle $\theta_{ave}$, unless stated otherwise.

A 'tilted film' or 'O plate' with tilted or splayed structure according to the present invention exhibits an average tilt angle of at least 10 degrees, whereas a tilted or splayed film with an average tilt angle of less than 10 degrees will be referred to as 'low tilt film' or 'low tilt A plate'.

In tilted, planar and homeotropic optical films comprising uniaxially positive birefringent liquid crystal material with uniform orientation, the optical axis of the film as referred to throughout this invention is given by the orientation direction of the main molecular axes of the mesogens of the liquid crystal material.

In a splayed film comprising uniaxially positive birefringent liquid crystal material with uniform orientation, the optical axis of the film as referred to throughout this invention is given by the projection of the orientation direction of the main molecular axes of the mesogens onto the surface of the film.

The term 'film' as used in this application includes self-supporting, i.e. free-standing, films that show more or less pronounced mechanical stability and flexibility, as well as coatings or layers on a supporting substrate or between two substrates.

The term 'liquid crystal or mesogenic material' or 'liquid crystal or mesogenic compound' should denote materials or compounds comprising one or more rod-shaped, board-shaped or disk-shaped mesogenic groups, i.e. groups with the ability to induce liquid crystal phase behaviour. The compounds or materials comprising mesogenic groups do not necessarily have to exhibit a liquid crystal phase themselves. It is also possible that they show liquid crystal phase behaviour only in mixtures with other compounds, or when the mesogenic compounds or materials, or the mixtures thereof, are polymerized.

SUMMARY OF THE INVENTION

Figure 1A:
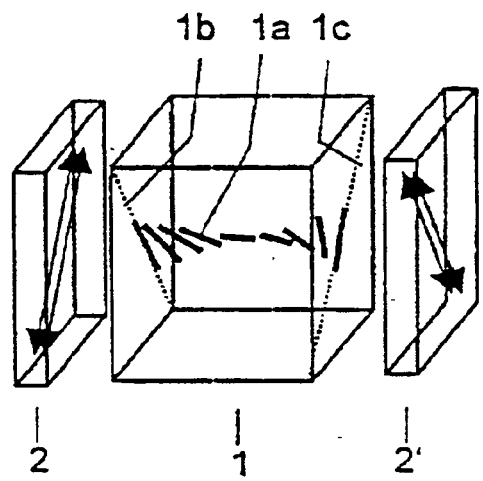
FIGS. 1a and 1b depict uncompensated prior art TN-LCD devices.

One aim of the present invention is to provide an optical compensator which has improved performance for compensation of LCDs, is easy to manufacture, in particularly for mass production, and does not have the drawbacks of prior art compensators as described above. Other aims of the present invention are immediately evident to the person skilled in the art from the following detailed description.

The inventors of the present invention have found that the above drawbacks can be overcome, and an optical compensator with superior performance for compensation of the optical properties of liquid crystal displays can be obtained by using a combination of at least one O plate retarder, at least one low tilt A plate retarder and at least one negative C plate retarder.

When using an optical compensator according to the present invention in an LCD, the contrast at large viewing angles and the grey level representation of the display are considerably improved, and grey scale inversion is suppressed. In case of coloured displays, the colour stability can be improved and changes of the colour gamut can be suppressed. Furthermore, a compensator according to the present invention is particularly suitable for mass production.

One object of the present invention is an optical compensator for liquid crystal displays, characterized in that it comprises at least one O plate retarder, at least one low tilt A plate retarder, at least one negative C plate retarder.

Another object of the invention is a liquid crystal display device comprising the following elements a liquid crystal cell formed by two transparent substrates having surfaces which oppose each other, an electrode layer provided on the inside of at least one of said two transparent substrates and optionally superposed with an alignment layer, and a liquid crystal medium which is present between the two transparent substrates, a polarizer arranged outside said transparent substrates, or a pair of polarizers sandwiching said substrates, and at least one optical compensator according to the present invention, being situated between the liquid crystal cell and at least one of said polarizers, it being possible for the above elements to be separated, stacked, mounted on top of each other or connected by means of adhesive layers in any combination of these means of assembly.

DETAILED DESCRIPTION OF THE INVENTION

Preferred embodiments of the present invention relate to an optical compensator comprising at least one O plate and at least one low tilt A plate as described above, wherein the average tilt angle $\theta_{ave}$ in the O plate is from 2 to 88°, preferably from 30 to 60°, the tilt angle $\theta$ in the O plate varies monotonuously in a direction perpendicular to the plane of the film, the tilt angle $\theta$ in the O plate varies from a minimum value $\theta_{min}$ at one surface of the film to a maximum value $\theta_{max}$ at the opposite surface of the film, $\theta_{min}$ in the O plate is from 0 to 80°, preferably from 1 to 20°, $\theta_{max}$ in the O plate is from 10 to 90°, preferably from 40 to 90°, the average tilt angle $\theta_{ave}'$ in the low tilt A plate is from 1 to 10°, in particular from 2 to 6°, very preferably from 3.5 to 4.5°, the tilt angle $\theta'$ in the low tilt A plate varies monotonuously in a direction perpendicular to the plane of the film, the tilt angle $\theta'$ in the low tilt A plate varies from a minimum value $\theta_{min}'$ at one surface of the film to a maximum value $\theta_{max}'$ at the opposite surface of the film, $\theta_{min}'$ in the low tilt A plate is from 0 to 10°, preferably from 0.5 to 3°, $\theta_{max}'$ in the low tilt A plate is from 1 to 10°, preferably from 3 to 8°, the thickness d of the O plate is from 0.1 to 10 $\mu$m, in particular from 0.2 to 5 $\mu$m, very preferably from 0.3 to 3 $\mu$m, the thickness d' of the low tilt A plate is from 0.1 to 10 $\mu$m, in particular from 0.2 to 5 $\mu$m, very preferably from 0.3 to 3 $\mu$m, the optical retardation d$\Delta$n of the O plate is from 6 to 300 nm, in particular from 10 to 200 nm, very preferably from 20 to 120 nm, the optical retardation d'$\Delta$n' of the low tilt A plate is from 12 to 575 nm, in particular from 20 to 300 nm, very preferably from 30 to 200 nm, the O plate and/or the low tilt A plate comprise a linear or crosslinked liquid crystalline polymer, the negative C plate comprises a chiral linear or crosslinked liquid crystalline polymer, the negative C plate is a bireferingent polymer film, the negative C plate is a birefringent triacetylcellulose (TAC) or diacetylcellulose (DAC) film.

Further preferred embodiments of the present invention relate to an optical compensator comprising one O plate, one low tilt A plate and one negative C plate, especially preferably wherein the negative C plate is situated between the O plate and the low tilt A plate, one O plate, one low tilt A plate and two negative C plates, one O plate and one low tilt A plate, at least one of which is provided on a negatively birefringent substrate that serves as negative C plate.

A further preferred embodiment of the present invention relates to a liquid crystal display comprising a liquid crystal cell, a pair of polarizers sandwiching the cell, and one inventive compensator as described above and below located on each side of the liquid crystal (LC) cell between the cell and the polarizer.

Especially preferred are displays wherein the LC cell is a twisted nematic or supertwisted nematic cell, the optical axis of the O plate and the low tilt A plate are oriented at right angles with each other, the O plate is facing the polarizer and the low tilt A plate is facing the LC cell, in case the O plate is facing the polarizer, its optical axis is parallel to the optical axis of the liquid crystal medium at the nearest surface of the liquid crystal cell, in case the O plate is facing the LC cell, its optical axis is at right angles to the optical axis of the liquid crystal medium at the nearest surface of the liquid crystal cell, the O plate is situated with its low tilt surface facing the polariser, Especially preferred compensator stacks for inventive displays according to the preferred embodiments as described above are shown in table 1. Therein, LC denotes a liquid crystal cell, O denotes a tilted or splayed O plate, A denotes a low tilt A plate, and −C denotes a negative C plate. For the case where the O plate is a splayed O plate, the arrow is denoting the preferred direction of increasing tilt angle.

For sake of simplicity, the polarizers are omitted in table 1. A display for practical applications will, however, further comprise a pair of polarizers sandwiching the stack as shown in table 1.

In the stack formats as shown in table 1 the single retarder components are arranged symmetrically, therefore incoming light may enter the stack from either side.

TABLE 1

Preferred compensator stacks in inventive displays

| | | | | | | | | |
|---|---|---|---|---|---|---|---|---|
| [A] | | ←O | −C | A | LC | A | −C | O→ |
| [B] | | A | −C | O→ | LC | ←O | −C | A |
| [C] | −C | A | ←O | −C | LC | −C | O→ | A | −C |
| [D] | −C | O→ | A | −C | LC | −C | A | ←O | −C |
| [E] | −C | A | −C | O→ | LC | ←O | −C | A | −C |
| [F] | ←O | −C | A | −C | LC | −C | A | −C | O→ |
| [G] | A | −C | ←O | −C | LC | −C | O→ | −C | A |
| [H] | −C | O→ | −C | A | LC | A | −C | ←O | −C |
| [I] | A | −C | −C | O→ | LC | ←O | −C | −C | A |
| [J] | ←O | −C | −C | A | LC | A | −C | −C | O→ |

Particularly preferred are compensator stacks of type [H] as shown in table 1, wherein the absolute retardation values of the O plate and the A plate are approximately the same.

Further preferred are stacks of type [H] as shown in table 1, wherein the optical axis of the O plate and the A plate are oriented at right angles with each other, and oriented at an angle of from 1 to 15°, preferably from 5 to 10°, relative to the polarization direction of the polarizer and/or relative to the optical axis of the liquid crystal medium at the nearest surface of the liquid crystal cell, respectively.

The inventive optical compensators can be used for compensation of conventional displays, in particular those of the twisted nematic or super twisted nematic mode, such as TN, HTN, STN or AMD-TN displays, in displays of the IPS (in plane switching) mode, which are also known as 'super TFT' displays, in displays of the DAP (deformation of aligned phases) or VA (vertically aligned) mode, like e.g. ECB (electrically controlled birefringence), CSH (colour super homeotropic), VAN or VAC (vertically aligned nematic or cholesteric) displays, in displays of the bend mode or hybrid type displays, like e.g. OCB (optically compensated bend cell or optically compensated birefringence), R-OCB (reflective OCB), HAN (hybrid aligned nematic) or π-cell displays.

Especially preferably the compensators are used for compensation of TN, HTN and STN displays.

In the following, the invention will exemplarily be described in detail for compensation of a TN display.

FIG. 1a depicts an uncompensated standard type TN display device in its off-state, i.e. when no voltage is applied, comprising a TN cell 1 with a liquid crystal layer in the twisted nematic state sandwiched between two transparent electrodes (which are not shown here), and a pair of linear polarizers 2,2'. The twisted nematic orientation of the liquid crystal layer is schematically depicted by the mesogens 1a. The dashed lines 1b and 1c represent the orientation direction of the mesogens 1a that are adjacent to the cell walls of the TN cell 1.

In the display device shown in FIG. 1a, the polarization axes of the linear polarizers 2,2' are oriented at right angles to the optical axis 1b,1c of the liquid crystal medium at the nearest surface of the liquid crystal cell 1, respectively. This orientation of the polarizers relative to the TN cell is hereinafter also generally referred to as 'E mode'.

Figure 1B:
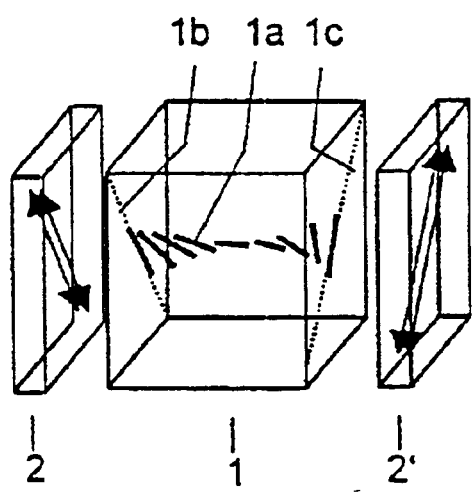

FIG. 1b depicts an uncompensated standard type TN display device like that of FIG. 1a, but wherein the polarization axes of the linear polarizers 2,2' are oriented parallel to the optical axis 1b,1c of the liquid crystal medium at the nearest surface of the liquid crystal cell 1, respectively. This orientation of the polarizers relative to the TN cell is hereinafter also generally referred to as 'O mode'.

Figure 2A:
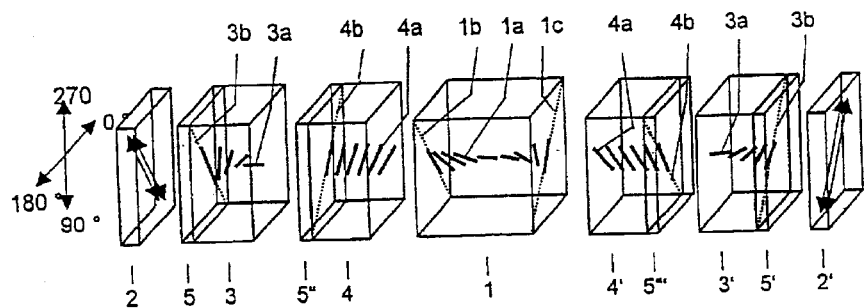
FIGS. 2a and 2b depict compensated TN-LCD devices with compensators according to a preferred embodiment of the present invention.
Figure 2B:
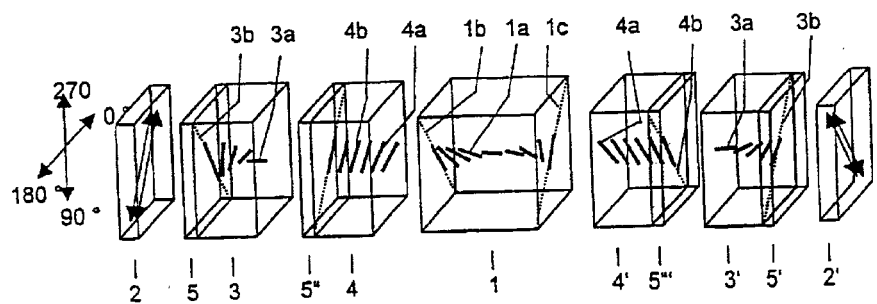

FIG. 2a, b schematically depict compensated TN-LCD devices according to preferred embodiments of the present invention in the off-state, with FIG. 2a showing a device in the O mode and FIG. 2b showing a device in the E mode, as explained above.

The devices consist of a TN cell 1 with a liquid crystal layer in a twisted nematic state sandwiched between two transparent electrodes (which are not shown here), a pair of linear polarizers 2,2' and two compensators, each compensator consisting of a splayed O plate 3,3' a low tilt A plate 4,4', and two negative C plates 5,5',5'' and 5''' on each side of the TN cell 1. The stack formats of the optical components in FIG. 2a, b correspond to type [H] of table 1 above.

In the devices examplarily shown in FIG. 2a, b each of the O plates 3,3' and the low tilt A plates 4,4' are provided directly on the negative C plates 5,5',5'',5''' which serve as substrates for the O and A plates.

The stacks of optical components in the devices shown in FIG. 1 and FIG. 2 are symmetrical, hence incoming light may enter the device from either side.

The C plates 3,3' consist, as an example, of a layer of polymerized liquid crystal material with splayed structure. The splayed structure is schematically depicted by the mesogens 3a and 3a' which are oriented with their main molecular axis tilted at an angle θ relative to the plane of the layer, wherein the tilt angle θ increases in a direction normal to the film, starting with a minimum value $θ_{min}$ on the side of the O plate 3,3' facing the TN cell 1.

The dashed lines 3b and 3b' represent the projection of the orientation directions of the mesogens 3a and 3a', respectively, in different regions of the O plates 3,3' onto the surfaces of the respective O plates 3,3'. The dashed lines 3b,3b' are also identical with the principal optical axis of the respective O plates 3,3'. In the devices shown in FIG. 2a, b, the principal optical axes of the O plates 3,3' are oriented parallel to the polarization direction of the respective adjacent linear polarizer 2,2', and parallel to the respective adjacent orientation direction 1b,1c of the mesogens 1a in the TN cell 1.

The low tilt A plates 4,4' consist, as an example, a layer of polymerized liquid crystalline material with a tilted structure and a low tilt angle as defined above. The tilted structure is represented by the mesogens 4a,4a' which are oriented with their main molecular axis tilted at an angle θ' relative to the plane of the layer, wherein the tilt angle θ' increases in a direction normal to the film, starting with a minimum value $θ_{min}'$ on the side of the low tilt A plate 4,4' facing the TN cell 1.

The dashed lines 4b and 4b' represent the projection of the orientation directions of the mesogens 4a and 4a', respectively, in different regions of the low tilt A plates 4,4' onto the surfaces of the respective A plates 4,4'. The dashed lines 4b,4b' are also identical with the principal optical axis of the respective low tilt A plates 4,4'. In the devices shown in FIG. 2a, b, the principal optical axis 4b,4b' of the low tilt A plate 4,4' is oriented at right angles to the polarization direction of the respective adjacent linear polarizer 2,2', and at right angles to the respective adjacent orientation direction 1b,1c of the mesogens 1a in the TN cell 1.

In the devices shown in FIG. 2a, b, the mesogens at the surface of the O plate 3,3' facing the TN cell 1 exhibit a planar orientation, i.e. the minimum tilt angle $θ_{min}$ is substantially 0 degrees. However, other values of $θ_{min}$ are also possible.

In the O plate according to the preferred embodiments as shown e.g. in FIG. 2a, b, the minimum tilt angle $θ_{min}$ is preferably from 0 to 80°, in particular from 1 to 20°, very preferably from 1 to 10° and most preferably from 1 to 5°. The maximum tilt angle $θ_{max}$ in an O plate according to these preferred embodiments is preferably from 10 to 90°, in particular from 20 to 90°, very preferably from 30 to 90°, most preferably from 40 to 90°.

In the devices shown in FIG. 2a, b, the mesogens at the surface of the low tilt A plate 4,4' facing the TN cell 1 exhibit a planar orientation, i.e. the minimum tilt angle $θ_{min}'$ is substantially 0 degrees. However, other values of $θ_{min}'$ are also possible.

In the low tilt A plate according to the preferred embodiments as shown e.g. in FIG. 2a, b, the minimum bit angle $θ_{min}'$ is preferably from 0 to 10°, in particular from 0.5 to 3°. The maximum tilt angle $θ_{max}'$ in an low tilt A plate according to these preferred embodiments is preferably from 1 to 10°, in particular from 3 to 8°.

In the devices shown in FIG. 2a, b, the low tilt A plate is a film that exhibits a tilted and splayed structure. It is, however, also possible to use a low tilt A plate with a tilted, but not splayed structure, wherein the tilt angle is substantially constant throughout the film.

Apart from the preferred embodiments as depicted in FIG. 2a, b, other combinations and stack formats of the O plates and low tilt A plates are also possible.

For example, in the preferred devices shown in FIG. 2a, b, the O plate 3 and the adjacent A plate 4, and/or the O plate 3' and the adjacent low tilt A plate 4', are mutually exchangeable with each other. Furthermore, the compensators or entire ORF stacks on one side of the TN cell are mutually exchangeable with the compensators or entire film stacks on the opposite side of the TN cell.

In the inventive devices exemplarily shown in FIG. 2a, b, the optical axes 3b,3b' of the O plates 3,3' and the optical axes 4b,4b' of the low tilt A plates 4,4' are either parallel or at right angles to the orientation direction 1b,1c of the mesogens 1a in the TN cell 1 and to the polarization direction of the polarizers 2,2'.

In another preferred embodiment of the present invention, the optical axes 3b,3b' of the O plates 3,3' are twisted within the film plane, at an angle±δ, and the optical axes 4b,4b' of the low tilt A plates 4,4' are twisted within the film plane, at an angle±δ, relative to the optical axes of the the orientation direction 1b,1c of the mesogens 1a in the TN cell 1 and to the polarization direction of the polarizers 2,2'. The absolute value of said twist angle±δ is preferably from 1 to 15°, very preferably from 5 to 10°.

Further to the preferred embodiments shown in FIG. 2a, b, a compensator according to the present invention may also comprise more than one O plate and/or more than one A plate.

In case the inventive compensator comprises two or more O plates, the optical axes of the O plates can be parallel one to another, or be oriented at an angle with one another. Preferably the optical axes of the O plates are oriented either parallel or at right angles to each other.

In case an inventive compensator comprises two or more O plates, each O plate can be arranged relative to the closest successive O plate such that their respective surfaces with minimum tilt angle $\theta_{min}$ are facing each other, or such that their respective surfaces with maximum tilt angle $\theta_{max}$ are facing each other, or such that the surface of a first O plate with minimum tilt angle $\theta_{min}$ is facing the surface of the closest successive O plate with maximum tilt angle $\theta_{max}$.

Further preferred arrangements of two or more O plates in an inventive compensator are those as described in WO 98/12584, in particular those according to the preferred embodiments described in WO 98/12584 on pages 8–11 and in FIGS. 1a, 1b and 1c.

In another preferred embodiment of the present invention, the optical compensator comprises one or more, especially preferably one or two, negative C plates. As a negative C plate, it is possible to use for example a negatively birefringent plastic substrate on which the twisted and/or the O plate are provided.

The devices shown in FIG. 2a, b comprise splayed O plates. Alternatively, it is possible to use tilted, but not splayed, O plates instead of, or in addition to splayed O plates in the inventive LC displays. Preferably, however the inventive LC displays do comprise one or more splayed O plates.

As an O plate for the inventive compensator it is possible to use an optical film comprising a polymerized liquid crystal material with tilted or splayed structure, as described in the U.S. Pat. No. 5,619,352, WO 97/44409, WO 97/44702, WO 97/44703 or WO 98/12584, with the entire disclosure of these documents being incorporated into this application by way of reference.

As an O plate, it is also possible to use a multilayer film comprising two or more sublayers of polymerized liquid crystal material, with each sublayer having a tilted structure with constant tilt angle, wherein said tilt angle increases or decreases monotonuously from one sublayer to the next sublayer throughout the multilayer.

In a preferred embodiment of the invention, the O plate is a tilted or splayed optical retardation film (ORF) film as described in WO 98/12584, or a film prepared in analogy to the methods disclosed therein. According to the WO 98/12584, an ORF with tilted or splayed structure can be obtained by coating a layer of a polymerizable mesogenic material onto a substrate or between two substrates, aligning the material into a tilted or splayed orientation, and polymerizing the material by exposure to heat or actinic radiation.

Alternatively it is possible to use as an O plate a liquid crystal film as described in WO 96/10770, which is prepared from a polymerizable liquid crystal material with a smectic A or smectic C phase and a nematic phase at higher temperatures. The polymerizable liquid crystal material is applied in its nematic phase onto a substrate that is, e.g., covered with an alignment layer of obliquely deposited SiO, and lowering the temperature into smectic C phase of the material. This leads to an increase of the tilt angle, as the material adopts its naturally tilted smectic C structure, which is then fixed by polymerization of the liquid crystal material. The above preparation method and possible variations thereof are described in detail in WO 96/10770, the entire disclosure of which is incorporated into this application by way of reference.

It is also possible to use as an O plate an inorganic thin film with a tilted microstructure, which can be obtained by oblique vapor deposition of an inorganic material, e.g. $Ta_2O_5$, as described in WO 96/10773.

Preferably the low tilt A plate is comprising one or more layers of polymerized liquid crystal material with a slightly tilted structure. Such layers can be prepared by using a high pre-tilt on the substate surface combined with a liquid crystal material which gives planar alignment at the air interface. Alternatively a liquid crystal material with an optimised tilt angle can be used. The thickness d of the O plate and the thickness d' of the low tilt A plate is in each case independently preferably from 0.1 to 10 μm, in particular from 0.2 to 5 μm, most preferably from 0.3 to 3 μm. For some applications, a film thickness between 2 and 15 μm is also suitable.

As negative C plate, it is possible to use a stretched or uniaxially compressed plastic film, as described e.g. in U.S. Pat. No. 4,701,028, or an inorganic thin film obtained by physical vapor deposition, as described e.g. in U.S. Pat. No. 5,196,953.

Particularly preferred are inventive compensators wherein the O plate is provided on a negatively birefringent substrate which serves as negative C plate. Further preferred are inventive compensators wherein each of the twisted and the O plate are provided on a negatively birefringent substrate.

As a negatively birefringent film substrate for example a uniaxially compressed plastic film, like e.g. PET, PVA, PC, tiacetylcellulose (TAC) or diacetylcellulose (DAC) can be used. Especially preferred are PVA, TAC and DAC films.

In a particularly preferred embodiment, the negative C plate is a film comprising one or more layers of anisotropic material having a highly twisted structure, wherein the helical pitch has a value below the visible wavelength range.

A highly twisted film, which has the structure of a twisted A plate as defined above but with a high twist angle, exhibits a compensation performance for liquid crystal displays that is at least equivalent to, and in some cases even better than, the performance of a conventional negatively birefringent C-plate retarder. In case the helical pitch of the highly twisted A plate is such that it shows selective reflection light of a wavelength below the visible range, the highly twisted A plate can be used as a negative C plate in the inventive compensator.

This is an additional benefit of the present invention, since the state of the art negatively birefringent C-plates in most cases either require complicated manufacturing procedures such as vapour deposition of an inorganic thin film (as described for example in U.S. Pat. No. 5,196,953), or they require the use of negatively birefringent materials, which are most often less easily available and more expensive than positively birefringent materials.

Figure 3:
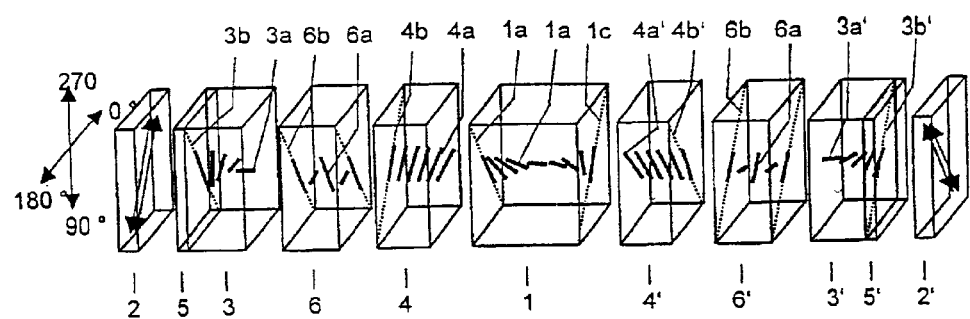
FIG. 3 depicts a compensated TN-LCD device with a compensator according to a preferred embodiment of the present invention.

Thus, FIG. 3 depicts a compensated TN-LCD device according to a further preferred embodiment of the invention in its off-state, i.e. when no voltage is applied, in the E mode. The device contains a TN cell 1 with a liquid crystal layer in the twisted nematic state sandwiched between two transparent electrodes (which are not shown here), and a pair of linear polarizers 2,2'. The device further comprises on each side of the TN cell an inventive compensator consisting of an O plate 3,3', a low tilt A plate 4,4,' a negative C plate 5,5' and a highly twisted A plate 6,6' which serve as negative C plate, wherein the O plates 3,3' are provided on the negative C plates 5,5' which serve as substrates. he stack format of the optical components in FIG. 3 corresponds to type [H] of table 1 above.

It should be noted that FIGS. 1–3 are not intended to depict the real proportions of the individual device components. Thus, for example in a real device according to FIG. 3 the negative C plates 5,5' are expected to have a higher thickness than the highly twisted A plates 6,6', i.e, different than suggested by the dimensions shown FIG. 3.

The highly twisted A plate preferably exhibits a chiral liquid crystal material, e.g. a cholesteric material, with a highly twisted structure wherein the main molecular axes of the mesogens are helically twisted at more than one full helix turn around an axis perpendicular to the plane of the film.

The twist angle $\phi$ of the twisted A plate can also be expressed by the helical pitch p of the liquid crystalline material and the thickness d" of the A plate according to the equation $$\phi = 360° \cdot d''/p$$

The helical pitch p of a highly twisted A plate in an inventive compensator is preferably less than 250 nm, so that the film does not reflect visible light. Preferably the pitch p is from 50 to 250 nm, in particular from 100 to 250 nm.

The thickness of a highly twisted A plate is preferably from 0.1 to 5 $\mu$m, in particular from 0.2 to 3 $\mu$m, very preferably from 0.3 to 1.5 $\mu$m.

A highly twisted A plate according to this preferred embodiment preferably comprises one or more layers of polymerized cholesteric liquid crystal material as described for example in GB 2,315,072, in particular as described therein on page 2–14 and in examples 1–5. These films do exhibit a very small helical pitch leading to a reflection wavelength in the UV range. For the purposes of the present invention, highly twisted A plates with a pitch as described in the GB 2,315,072, most preferably with an even smaller pitch, are preferred. These films can be prepared according to or in analogy to the methods described in GB 2,315,072.

Alternatively, it is also possible to use as highly twisted A plate one or more layers of platelets or platelet-shaped flakes comprising an oriented polymerized cholesteric liquid crystal material with planar orientation, these platelets or flakes being dispersed in a light-transmissive binder, and being oriented such that the helix axis of the cholesteric liquid crystal material extends substantially perpendicular to the plane of the layer. Suitable platelets or flakes are described e.g. in WO 97/30136 (Merck), WO 96/18129 (CRL), U.S. Pat. No. 5,364,557 (Faris), EP 0 601 483, EP 0 773 250 or U.S. Pat. No. 5,827,449 (Wacker).

In a preferred embodiment of the invention, the highly twisted A plate is a film as described in GB 2,315,072, or a film prepared in analogy to the methods disclosed therein, with the entire disclosure of this document being incorporated into this application by way of reference.

Thus, according to GB 2,315,072 a highly twisted A plate can be obtained by coating a layer of a chiral polymerizable mesogenic material onto a substrate or between two substrates, aligning the material into a twisted orientation, wherein the helical twist axis is perpendicular to the plane of the layer, and polymerizing the material by exposure to heat or actinic radiation.

In another preferred embodiment of the present invention the compensator additionally comprises one or more twisted A plates with low or moderate twist, in particular with a twist angle below 360°. In these twisted A plates, the twist angle $\phi$ is preferably from 90° to 270°. As a twisted A plate, it is possible to use e.g. a twisted nematic polymer film as described in the EP 0 423 881 (Philips), EP 0 576 931 (Casio) or U.S. Pat. No. 5,243,451 (Ricoh).

In case of the twisted or highly twisted A plate, it is also possible to use a layer of a non-polymerized liquid crystal material. For example, a nematic liquid crystal mixture can be used that is provided between two transparent substrates and exhibits a planar twisted orientation, wherein the twist is induced by different orientation of the liquid crystal molecules at the substrates, like in a standard type TN cell, or the twist is brought about by one or more chiral dopants added to the nematic material. Alternatively a layer of a cholesteric liquid crystal mixture can be used.

As linear polarizer, a standard type commercially available polarizer can be used. In a preferred embodiment of the present invention the linear polarizer is a low contrast polarizer. In another preferred embodiment of the present invention the linear polarizer is a dichroic polarizer, like a dyed polarizer.

The individual optical components in the inventive compensators and displays, such as the liquid crystal cell, the individual retarders and the linear polarizers, can be separated or can be laminated to other components. They can be stacked, mounted on top of each other or be connected e.g. by means of adhesive layers.

It is also possible that stacks of two or more retarders are prepared by coating the liquid crystalline material of an retarder directly onto an adjacent retarder, the latter serving as substrate.

The optical compensator and/or the display device according to the present invention may further comprise one or more adhesive layers provided to the individual optical components like the liquid crystal cell, the polarizers and the different retarders.

In case the polymerized liquid crystal material in the O plate and/or the A plate is a polymer with high adhesion, separate adhesive layers may also be omitted. Highly adhesive polymers are for example liquid crystal polyepoxides. Furthermore, liquid crystal linear polymers or crosslinked polymers with low degree of crosslinking show higher adhesion than highly crosslinked polymers. The above highly adhesive liquid crystal polymers are therefore preferred for specific applications, especially for those which do not tolerate additional adhesive layers.

The inventive compensator may also comprise one or more protective layers provided on the surface of the individual optical components described above.

In case of the twisted and highly twisted A plate, the polymerizable material comprises achiral polymerizable mesogenic compounds and further comprises at least one chiral compound. The chiral compounds can be selected from non-polymerizable chiral compounds, like e.g. chiral dopants as used in liquid crystal mixtures or devices, polymerizable chiral non-mesogenic or polymerizable chiral mesogenic compounds.

In case of the O plate and the low tilt A plate, the polymerizable material preferably consists essentially of achiral polymerizable mesogenic compounds.

Preferably a polymerizable mesogenic material is used that comprises at least one polymerizable mesogen having one polymerizable functional group and at least one polymerizable mesogen having two or more polymerizable functional groups.

In another preferred embodiment the polymerizable material comprises polymerizable mesogenic compounds having two or more polymerizable functional groups (di- or multireactive or di- or multifunctional compounds). Upon polymerization of such a mixture a three-dimensional polymer network is formed. An optical retardation film made of such a network is self-supporting and shows a high mechanical and thermal stability and a low temperature dependence of its physical and optical properties.

By varying the concentration of the multifunctional mesogenic or non mesogenic compounds the crosslink density of the polymer film and thereby its physical and chemical properties such as the glass transition temperature, which is also important for the temperature dependence of the optical properties of the optical retardation film, the thermal and mechanical stability or the solvent resistance can be tuned easily.

The achiral and chiral polymerizable mesogenic mono-, di- or multireactive compounds used for the instant invention can be prepared by methods which are known per se and which are described, for example, in standard works of organic chemistry such as, for example, Houben-Weyl, Methoden der organischen Chemie, Thieme-Verlag, Stuttgart. Typical examples are described for example in WO 93/22397; EP 0 261 712; DE 19504224; DE 4408171 and DE 4405316. The compounds disclosed in these documents, however, are to be regarded merely as examples that do not limit the scope of this invention.

Examples representing especially useful monoreactive chiral and achiral polymerizable mesogenic compounds are shown in the following list of compounds, which should, however, be taken only as illustrative and is in no way intended to restrict, but instead to explain the present invention:

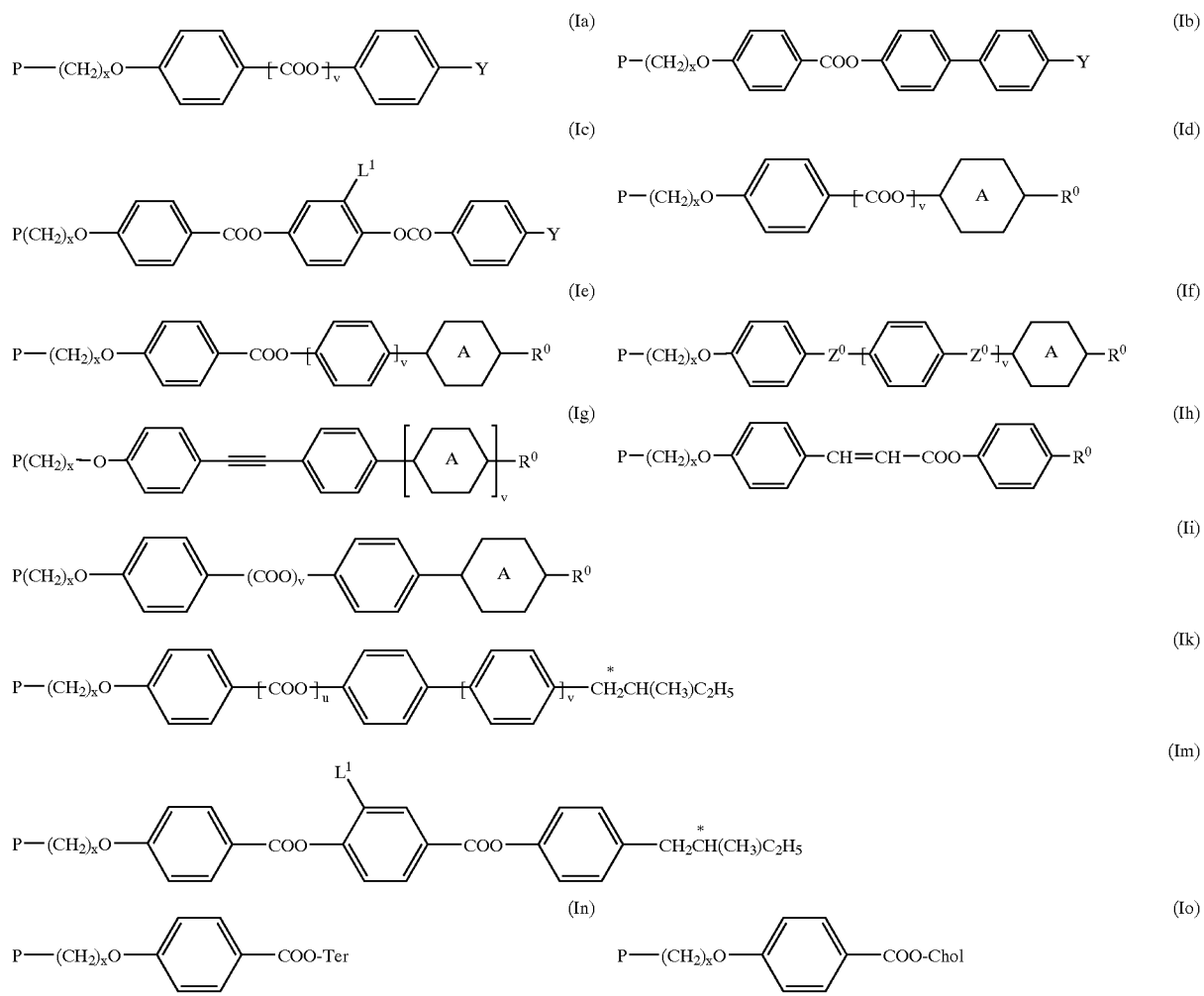

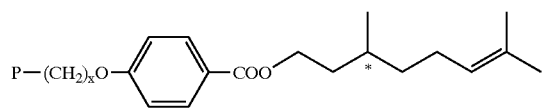 (Ip)

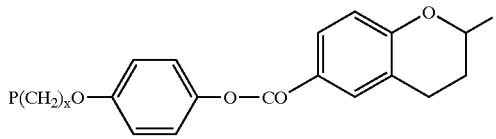 (Iq)

Examples of useful direactive chiral and achiral polymerizable mesogenic compounds are shown in the following list of compounds, which should, however, be taken only as illustrative and is in no way intended to restrict, but instead to explain the present invention The term 'polar group' in this connection means a group selected from F, Cl, CN, $NO_2$, OH, $OCH_3$, OCN, SCN, an optionally fluorinated carbonyl or carboxyl group with up to 4 C atoms or a mono- oligo- or polyfluorinated alkyl or alkoxy group with 1 to 4 C atoms.

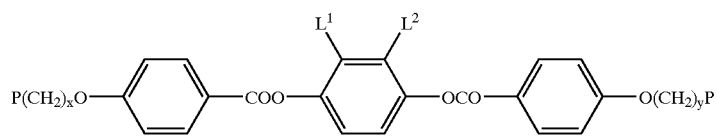 (IIa)

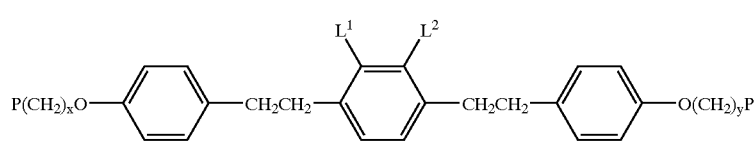 (IIb)

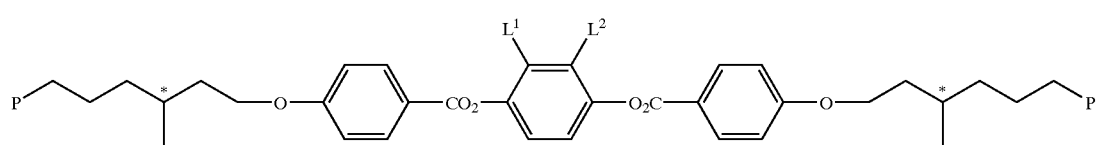 (IIc)

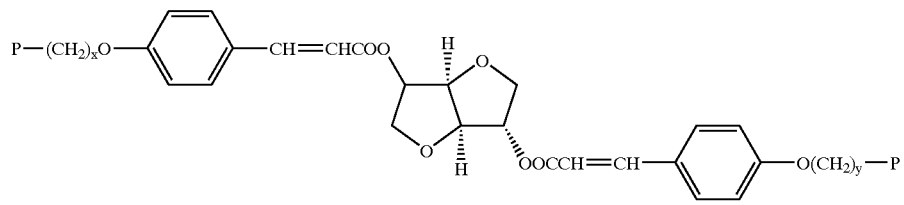 (IId)

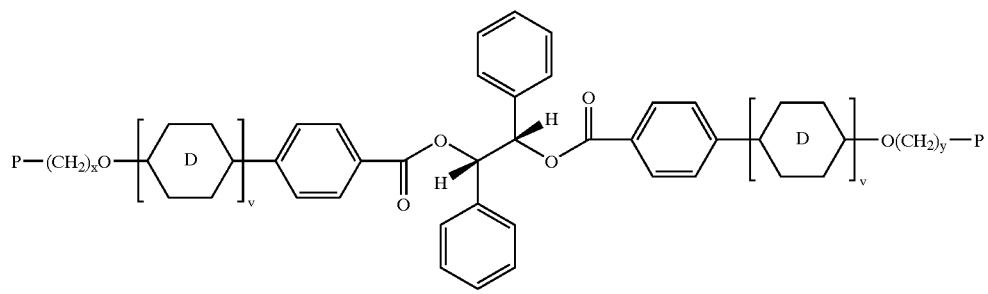 (IIe)

In the above formulae, P is a polymerizable group, preferably an acryl, methacryl, vinyl, vinyloxy, propenyl ether, epoxy or stytryl group, x and y are each independently 1 to 12, A is 1,4-phenylene that is optionally mono- di or trisubstituted by $L^1$ or 1,4-cyclohexylene, v is 0 or 1, $Z^0$ is —COO—, —OCO—, —$CH_2CH_2$— or a single bond, Y is a polar group, $R^0$ is an unpolar alkyl or alkoxy group, Ter is a terpenoid radical like e.g. menthyl, Chol is a cholesteryl group, and $L^1$ and $L^2$ are each independently H, F, Cl, CN or an optionally halogenated alkyl, alkoxy, alkylcarbonyl, alkoxycarbonyl or alkoxycarbonyloxy group with 1 to 7 C atoms.

The term 'unpolar group' means an alkyl group with 1 or more, preferably 1 to 12 C atoms or an alkoxy group with 2 or more, preferably 2 to 12 C atoms.

In case of the prepartion of the twisted A plate, the chiral polymerizable mesogenic material may comprise one or more non-polymerizable chiral dopants in addition or alternatively to chiral polymerizable mesogenic compounds. Especially preferred are chiral dopants with a high helical twisting power (HTP), in particular those disclosed in WO 98/00428. Further typically used chiral dopants are e.g. the commercially available S 1011, R 811 or CB 15 (from Merck KGaA, Darmstadt, Germany).

Especially preferred are chiral non-polymerizable dopants selected from the following formulae

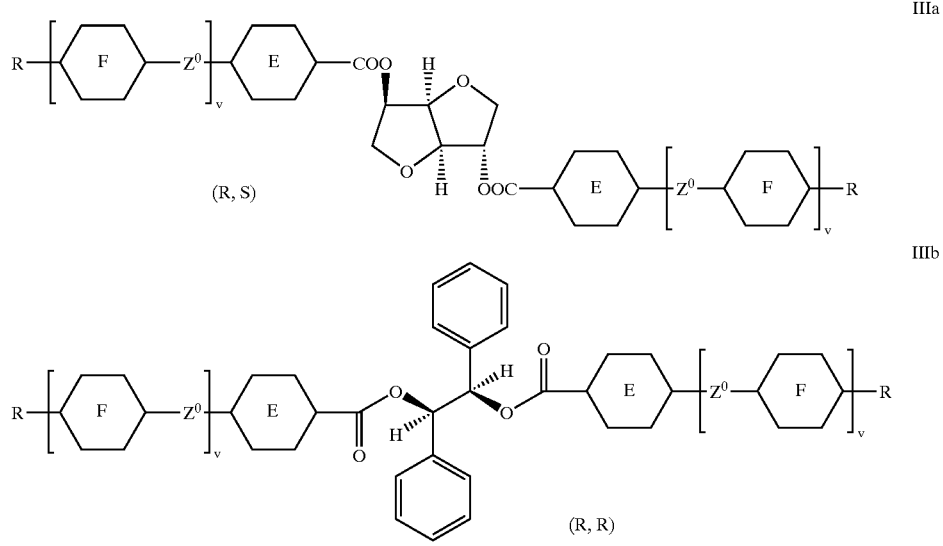

including the (R,S), (S,R), (R,R) and (S,S) enantiomers not shown, wherein E and F are each independently 1,4-phenylene or trans-1,4-cyclohexylene, v is 0 or 1, $Z^0$ is —COO—, —OCO—, —CH$_2$CH$_2$— or a single bond, and R is alkyl, alkoxy or alkanoyl with 1 to 12 C atoms.

The compounds of formula IIIa and their synthesis are described in WO 98/00428. The compounds of formula IIIb and their synthesis are described in GB 2,328,207.

The above chiral compounds of formula IIIa and IIIb exhibit a very high helical twisting power (HTP), and are therefore particularly useful for the preparation of a highly twisted ORF as used in the present invention.

The polymerizable mesogenic material is coated onto substrate, aligned into a uniform orientation and polymerized according to a process as described in WO 98/12584 or GB 2,315,072, thereby permanently fixing the orientation of the polymerizable mesogenic material.

As a substrate for example a glass or quartz sheet or a plastic film or sheet can be used. It is also possible to put a second substrate on top of the coated mixture prior to and/or during and/or after polymerization. The substrates can be removed after polymerization or not. When using two substrates in case of curing by actinic radiation, at least one substrate has to be transmissive for the actinic radiation used for the polymerization. Isotropic or birefringent substrates can be used. In case the substrate is not removed from the polymerized film after polymerization, preferably isotropic substrates are used.

Preferably at least one substrate is a plastic substrate such as for example a film of polyester such as polyethyleneterephthalate (PET), of polyvinylalcohol (PVA), polycarbonate (PC) or triacetylcellulose (TAC), especially preferably a PET film or a TAC film. As a birefringent substrate for example an uniaxially stretched plastic film can be used. For example PET films are commercially available from ICI Corp. under the trade name Melinex.

The polymerizable mesogenic material can also be dissolved in a solvent, preferably in an organic solvent. The solution is then coated onto the substrate, for example by spin-coating or other known techniques, and the solvent is evaporated off before polymerization. In most cases it is suitable to heat the mixture in order to facilitate the evaporation of the solvent.

For preparing an ORF with twisted structure, it is necessary to achieve planar alignment in the layer of the chiral polymerizable material, i.e. with the helical axis being oriented substantially perpendicular to the plane of the layer. Planar alignment can be achieved for example by shearing the material, e.g. by means of a doctor blade. It is also possible to apply an alignment layer, for example a layer of rubbed polyimide or sputtered SiO$_x$, on top of at least one of the substrates.

Planar alignment of the polymerizable mesogenic material can also be achieved by directly rubbing the substrate, i.e. without applying an additional alignment layer. This is a considerable advantage as it allows a significant reduction of the production costs of the optical retardation film. In this way a low tilt angle can easily be achieved.

For example rubbing can be achieved by means of a rubbing cloth, such as a velvet cloth, or with a flat bar coated with a rubbing cloth. In a preferred embodiment of the present invention rubbing is achieved by means of a at least one rubbing roller, like e.g. a fast spinning roller that is brushing across the substrate, or by putting the substrate between at least two rollers, wherein in each case at least one of the rollers is optionally covered with a rubbing cloth. In another preferred embodiment of the present invention rubbing is achieved by wrapping the substrate at least partially at a defined angle around a roller that is preferably coated with a rubbing cloth.

The polymerizable composition according to the the present invention may also comprise one or more surfactans to improve planar alignment. Suitable surfactants are described for example in J. Cognard, Mol. Cryst. Liq. Cryst 78, Supplement 1, 1–77 (1981). Particularly preferred are non-ionic surfactants, such as the commercially available fluorocarbon surfactants Fluorad 171 (from 3M Co.), or Zonyl FSN (from DuPont). Preferably the polymerizable mixture comprises 0.01 to 5%, in particular 0.1 to 3%, very preferably 0.2 to 2% by weight of surfactants.

The orientation of the mesogenic material depends, inter alia, on the film thickness, the type of substrate material, and the composition of the polymerizable mesogenic material. It is therefore possible, by changing these parameters, to control the structure of the ORF, in particular specific parameters such as the tilt angle and its degree of variation.

Thus, for the preparation of the O plate, it is possible to adjust the alignment profile in the direction perpendicular to the film plane by appropriate selection of the ratio of monoreactive mesogenic compounds, i.e. compounds with one polymerizable group, and direactive mesogenic compounds, i.e. compounds with two polymerizable groups.

For an O plate with strong splay, i.e. a large variation of the tilt angle throughout the thickness of the film, preferably the ratio of mono- to direactive mesogenic compounds should be in the range of 6:1 to 1:2, preferably 3:1 to 1:1, especially preferably about 3:2.

Another effective means to adjust the desired splay geometry is to use a defined amount of dielectrically polar polymerizable mesogenic compounds in the polymerizable mesogenic material. These polar compounds can be either monoreactive or direactive. They can be either dielectrically positive or negative. Most preferred are dielectrically positive and monoreactive mesogenic compounds.

The amount of the polar compounds in the mixture of polymerizable mesogenic material is preferably 1 to 80%, especially 3 to 60%, in particular 5 to 40% by weight of the total mixture.

Polar mesogenic compound in this connection means a compound with one or more polar groups as defined above. Especially preferred are monoreactive polar compounds selected from formulae Ia to Ic given above.

Furthermore, these polar compounds preferably exhibit a high absolute value of the dielectric anisotropy $\Delta\epsilon$, which is typically higher than 1.5. Thus, dielectrically positive compounds preferably exhibit $\Delta\epsilon>1.5$ and dielectrically negative polar compounds preferably exhibit $\Delta\epsilon<-1.5$. Very preferred are dielectrically positive polar compounds with $\Delta\epsilon>3$, in particular with $\Delta\epsilon>5$.

Polymerization of the polymerizable mesogenic material takes place by exposing it to heat or actinic radiation. Actinic radiation means irradiation with light, like UV light, IR light or visible light, irradiation with X-rays or gamma rays or irradiation with high energy particles, such as ions or electrons. Preferably polymerization is carried out by UV irradiation.

As a source for actinic radiation for example a single UV lamp or a set of UV lamps can be used. When using a high lamp power the curing time can be reduced. Another possible source for actinic radiation is a laser, like e.g. a UV laser, an IR laser or a visible laser.

The polymerization is carried out in the presence of an initiator absorbing at the wavelength of the actinic radiation. For example, when polymerizing by means of UV light, a photoinitiator can be used that decomposes under UV irradiation to produce free radicals or ions that start the polymerization reaction.

When curing polymerizable mesogens with acrylate or methacrylate groups, preferably a radical photoinitiator is used, when curing polymerizable mesogens vinyl and epoxide groups, preferably a cationic photoinitiator is used.

It is also possible to use a polymerization initiator that decomposes when heated to produce free radicals or ions that start the polymerization.

As a photoinitiator for radical polymerization for example the commercially available Irgacure 651, Irgacure 184, Darocure 1173 or Darocure 4205 (all from Ciba Geigy AG) can be used, whereas in case of cationic photopolymerization the commercially available UVI 6974 (Union Carbide) can be used.

The polymerizable mesogenic material preferably comprises 0.01 to 10%, very preferably 0.05 to 5%, in particular 0.1 to 3% of a polymerization initiator. UV photoinitiators are preferred, in particular radicalic UV photoinitiators.

The curing time is dependening, inter alia, on the reactivity of the polymerizable mesogenic material, the thickness of the coated layer, the type of polymerization initiator and the power of the UV lamp. The curing time according to the invention is preferably not longer than 10 minutes, particularly preferably not longer than 5 minutes and very particularly preferably shorter than 2 minutes. For mass production short curing times of 3 minutes or less, very preferably of 1 minute or less, in particular of 30 seconds or less, are preferred.

In addition to polymerization initiators the polymerizable material may also comprise one or more other suitable components such as, for example, catalysts, stabilizers, chain-transfer agents, co-reacting monomers or surface-active compounds. In particular the addition of stabilizers is preferred in order to prevent undesired spontaneous polymerization of the polymerizable material for example during storage.

As stabilizers in principal all compounds can be used that are known to the skilled in the art for this purpose. These compounds are commercially available in a broad variety. Typical examples for stabilizers are 4-ethoxyphenol or butylated hydroxytoluene (BHT).

Other additives, like e.g. chain transfer agents, can also be added to the polymerizable material in order to modify the physical properties of the inventive polymer film. When adding a chain transfer agent, such as monofunctional thiol compounds like e.g. dodecane thiol or multifunctional thiol compounds like e.g. trimethylpropane tri(3-mercaptopropionate), to the polymerizable material, the length of the free polymer chains and/or the length of the polymer chains between two crosslinks in the inventive polymer film can be controlled. When the amount of the chain transfer agent is increased, the polymer chain length in the obtained polymer film is decreasing.

It is also possible, in order to increase crosslinking of the polymers, to add up to 20% of a non mesogenic compound with two or more polymerizable functional groups to the polymerizable material alternatively or in addition to the di- or multifunctional polymerizable mesogenic compounds to increase crosslinking of the polymer.

Typical examples for difunctional non mesogenic monomers are alkyldiacrylates or alkyldimethacrylates with alkyl groups of 1 to 20 C atoms. Typical examples for non mesogenic monomers with more than two polymerizable groups are trimethylpropanetrimethacrylate or pentaerythritoltetraacrylate.

In another preferred embodiment the mixture of polymerizable material comprises up to 70%, preferably 3 to 50% of a non mesogenic compound with one polymerizable functional group. Typical examples for monofunctonal non mesogenic monomers are alkylacrylates or alkylmethacrylates.

It is also possible to add, for example, a quantity of up to 20% by weight of a non polymerizable liquid-crystalline compound to adapt the optical properties of the optical retardation film.

In some cases it is of advantage to apply a second substrate to aid alignment and exclude oxygen that may inhibit the polymerization. Alternatively the curing can be carried out under an atmosphere of inert gas. However, curing in air is also possible using suitable photoinitiators and high UV lamp power. When using a cationic photoinitiator oxygen exclusion most often is not needed, but water should be excluded. In a preferred embodiment of the invention the polymerization of the polymerizable mesogenic material is carried out under an atmosphere of inert gas, preferably under a nitrogen atmosphere.

To obtain a polymer film with the desired molecular orientation the polymerization has to be carried out in the liquid crystal phase of the polymerizable mesogenic material. Therefore, preferably polymerizable mesogenic compounds or mixtures with low melting points and broad liquid crystal phase ranges are used. The use of such materials allows to reduce the polymerization temperature, which makes the polymerization process easier and is a considerable advantage especially for mass production.

The selection of suitable polymerization temperatures depends mainly on the clearing point of the polymerizable material and inter alia on the softening point of the substrate. Preferably the polymerization temperature is at least 30 degrees below the clearing temperature of the polymerizable mesogenic mixture.

Polymerization temperatures below 120° C. are preferred. Especially preferred are temperatures below 90° C., in particular temperatures of 60° C. or less.

The invention is further explained by the following examples. Therein, the following abbreviations are used:

| | |
|---|---|
| $\theta$ | tilt angle [degrees] |
| $\phi$ | twist angle [degrees] |
| p | helical pitch [nm] |
| $n_e$ | extraordinary refractive index (at 20° C. and 589 nm) |
| $n_o$ | ordinary refractive index (at 20° C. and 589 nm) |
| $\epsilon_{\parallel}$ | dielectric constant parallel to the long molecular axis (at 20° C. and 1 kHz) |
| $\epsilon_{\perp}$ | dielectric constant perpendicular to the long molecular axis (at 20° C. and 1 kHz) |
| $K_{11}$ | first elastic constant |
| $K_{22}$ | second elastic constant |
| $K_{33}$ | third elastic constant |
| $V_{on}$ | threshold voltage [V] |
| $V_{off}$ | saturation voltage [V] |
| d | layer thickness [$\mu$m] |

COMPARISON EXAMPLE A

An uncompensated standard type TN-LCD device of the E mode as depicted in FIG. 1a, comprising a TN cell 1 and a pair of linear polarizers 2,2' has the following parameters

| | |
|---|---|
| $n_e$ | 1.5700 |
| $n_o$ | 1.4785 |
| $\epsilon_{\perp}$ | 3.5 |
| $\epsilon_{\parallel}$ | 10.8 |
| $K_{11}$ | 11.7 |
| $K_{22}$ | 5.7 |
| $K_{33}$ | 15.7 |
| d | 5.25 $\mu$m |
| pre-tilt | 2° |
| $V_{on}$ | 4.07 V |
| $V_{off}$ | 1.56 V |

Figure 4A:
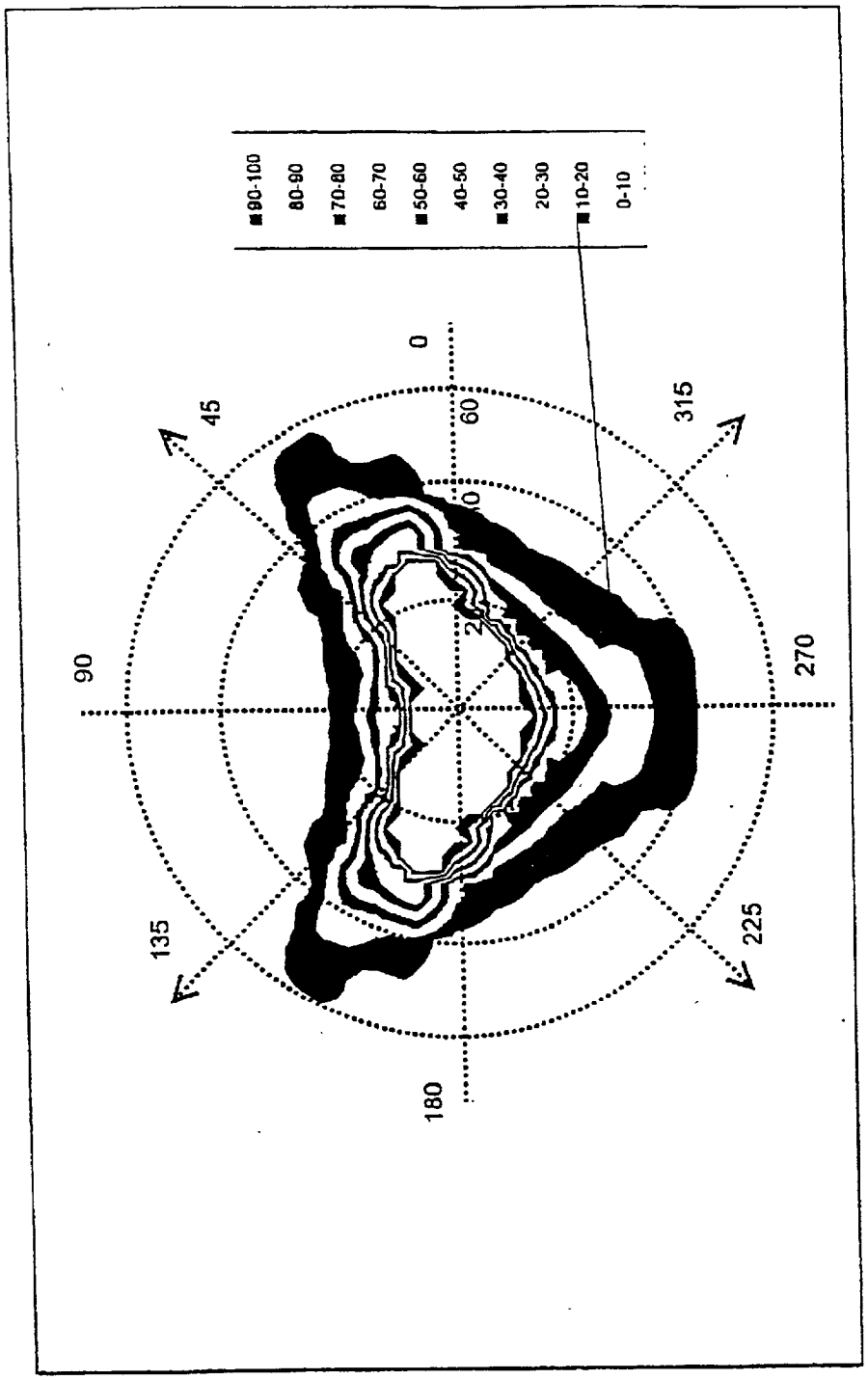
FIG. 4a is an isocontrast plot of an uncompensated prior art TN-LCD device according to comparison example A.

FIG. 4a depicts the isocontrast plot of the display, showing ranges of identical contrast in steps of 10%. The isocontrast plots are measured as luminance at $V_{on}$/luminance at $V_{off}$.

Figure 4B:
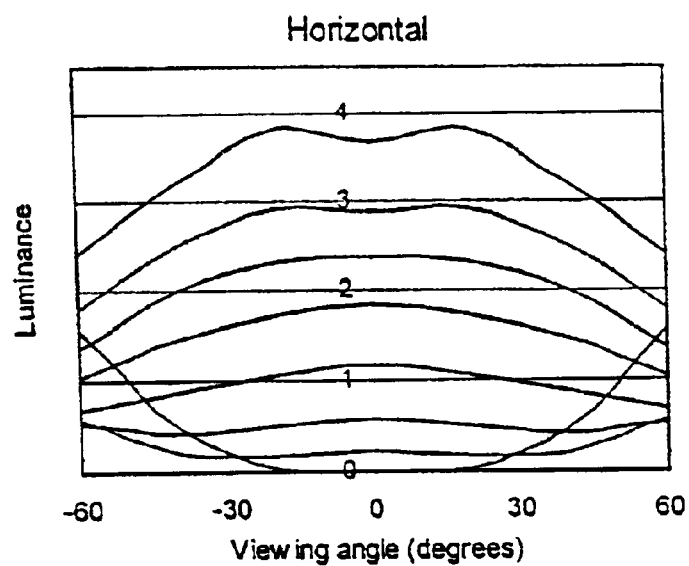
FIGS. 4b and 4c are grey level diagrams of an uncompensated prior art TN-LCD device according to comparison example A in horizontal (4b) and vertical (4c) viewing planes.
Figure 4C:
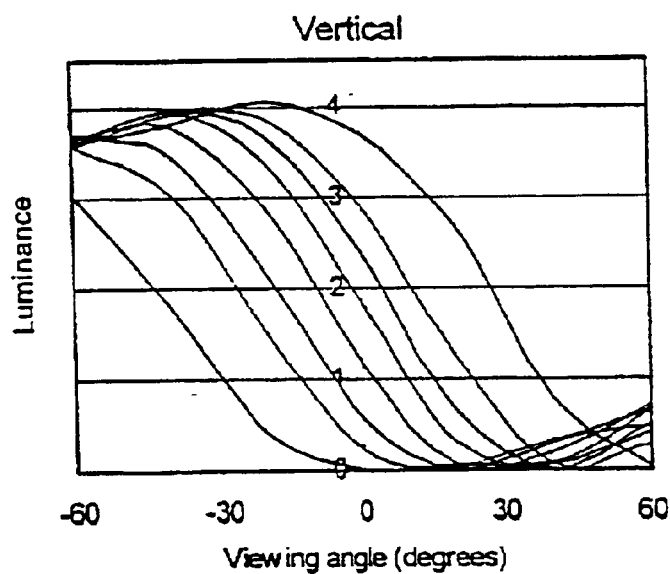

FIGS. 4b and 4c show 8 grey levels (given as transmission versus viewing angle), on a linear luminance scale in horizontal and vertical viewing planes, respectively. Ideally, the grey level lines should be parallel, where they cross, grey level inversion occurs. The latter is a serious disadvantage especially for the darker grey levels. It can be seen in FIG. 4b that levels 7 and 8 are very poor even at low angles such as 30° in horizontal direction, and in FIG. 4c that the levels cross at angles of 30° and higher in vertical direction.

The polarisers can be any standard polariser used in normal LCD displays.

$V_{on}$, $V_{off}$ correspond to values generally adopted in TN and STN-LCD displays.

COMPARISON EXAMPLE B

An uncompensated standard type TN-LCD device of the O mode as depicted in FIG. 1b, comprising a TN cell 1 and a pair of linear polarizers 2,2', has the parameters as given in comparison example A.

Figure 5A:
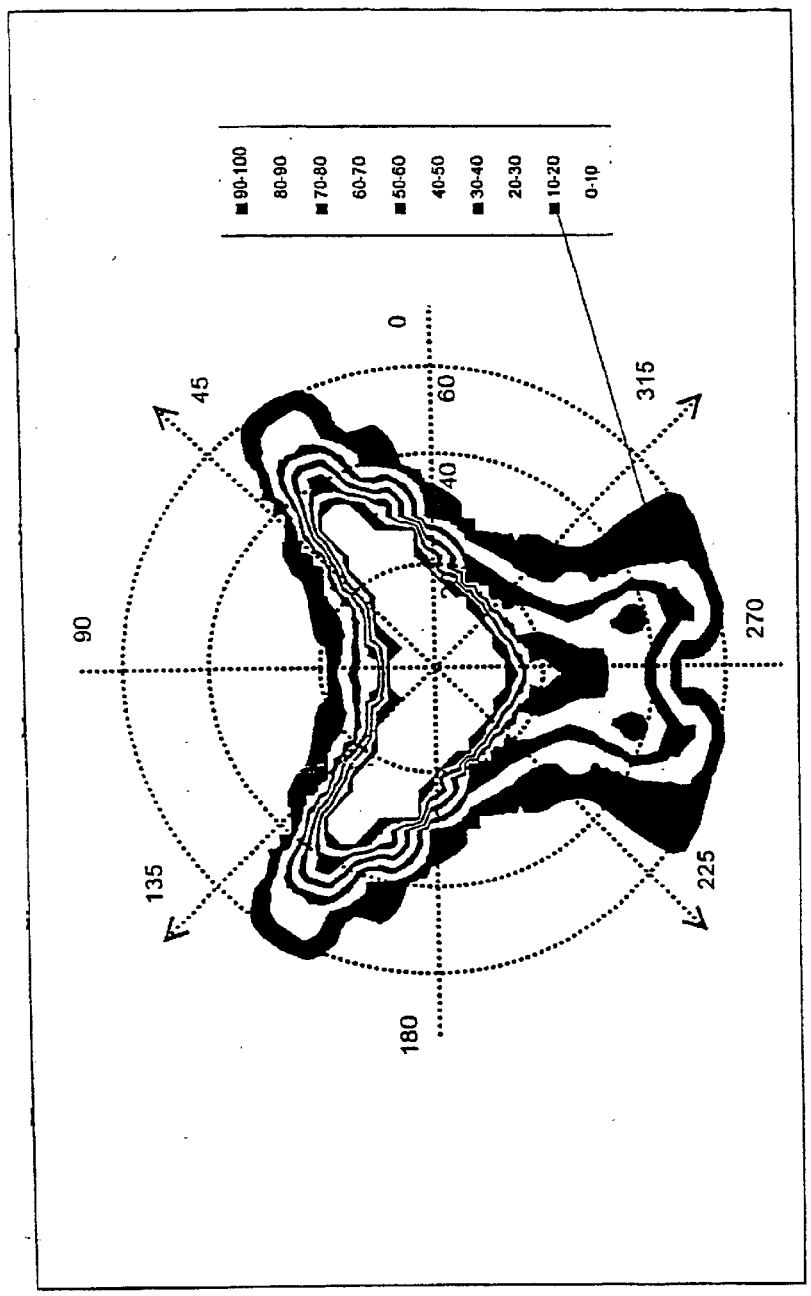
FIG. 5a is an isocontrast plot of an uncompensated prior art TN-LCD device according to comparison example B.

FIG. 5a depicts the isocontrast plot of the display, showing ranges of identical contrast in steps of 10%. The isocontrast plots are measured as luminance at $V_{on}$/luminance at $V_{off}$.

Figure 5B:
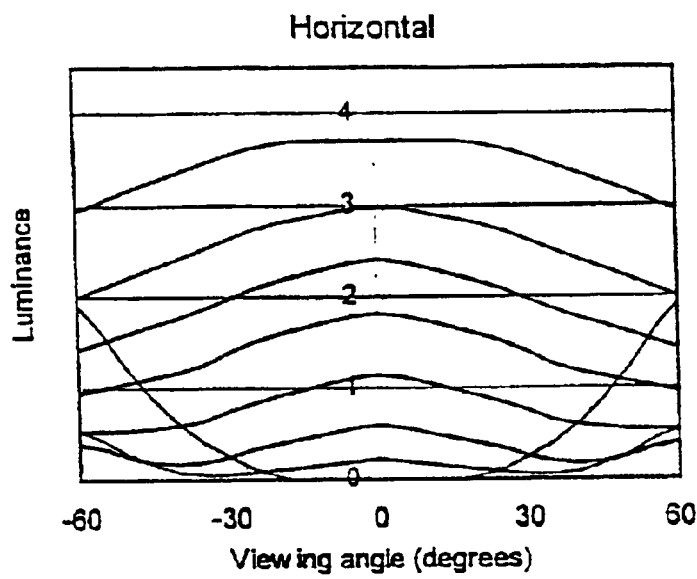
FIGS. 5b and 5c are grey level diagrams of a conventional uncompensated TN-LCD device according to comparison example B in horizontal (5b) and vertical (5c) viewing planes.
Figure 5C:
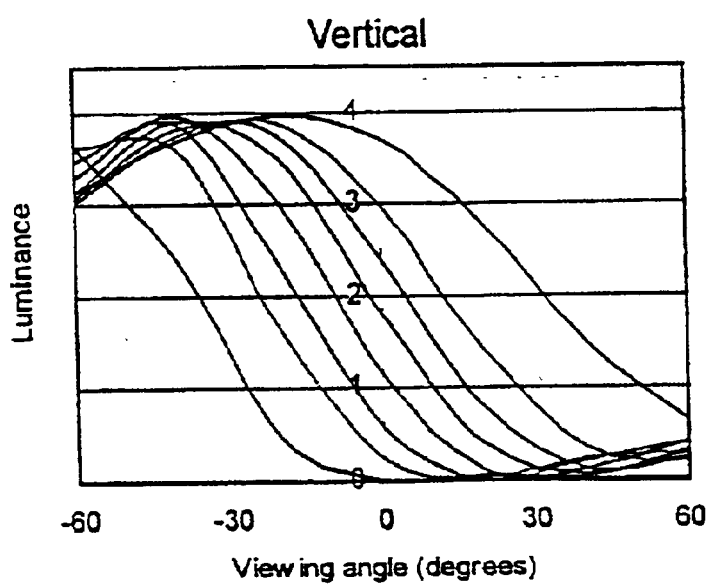

FIGS. 5b and 5c show the grey levels in horizontal and vertical viewing planes, respectively. It can be seen in FIG. 5b that levels 7 and 8 are very poor even at low angles such as 30° in horizontal direction, and in FIG. 5c that the levels cross at angles of 30° and higher in vertical direction.

EXAMPLE 1

A compensated TN-LCD device of the O mode according to the present invention as depicted in FIG. 2a consists of a TN cell 1 with a liquid crystal layer in a twisted nematic state, a pair of linear polarizers 2,2', two splayed O plates 3,3', two low tilt A plates 4,4', and four negative C plates 5,5' serving as substrates for the O plates and low tilt A plates. The stack format of the optical components corresponds to type [H] of table 1 above.

The TN cell 1 and the polarizers 2,2' are as defined in comparison example A.

The O plates 3,3' exhibit a splayed structure with the tilt angle θ ranging from $\theta_{min}$ on one surface to $\theta_{max}$ on the opposite surface.

The parameters of the O plates 3,3' are as follows

| | |
|---|---|
| $\theta_{min}$ | 2° |
| $\theta_{max}$ | 88° |
| $\theta_{ave}$ | 45° |
| $n_e$ | 1.610 |
| $n_o$ | 1.495 |
| d | 1.2 $\mu$m |
| retardation | 70 nm |

The parameters of the low tilt A plates 4,4' are as follows

| | |
|---|---|
| $\theta_{min}$ | 0° |
| $\theta_{max}$ | 8° |
| $\theta_{ave}$ | 4° |
| $n_e$ | 1.610 |
| $n_o$ | 1.495 |
| d' | 0.91 $\mu$m |
| retardation | 104 nm |

In the display device according to example 1, the orientation directions of the optical axes of the individual optical films within the film plane are given in table 2 below. For a better understanding, the orientation directions of 0°, 90°, 180° and 270° are also depicted by the arrows on the left side of FIGS. 2a, 2b and 3.

TABLE 2

Orientation direction of the optical axes of individual components in a display according to example 1

| | |
|---|---|
| left polarizer 2 | 45° |
| O plate 3 | 225° |
| low tilt A plate 4 | 135° |
| low tilt A plate 4' | 225° |
| O plate 3' | 135° |
| right polarizer 2' | 315° |

Figure 6A:
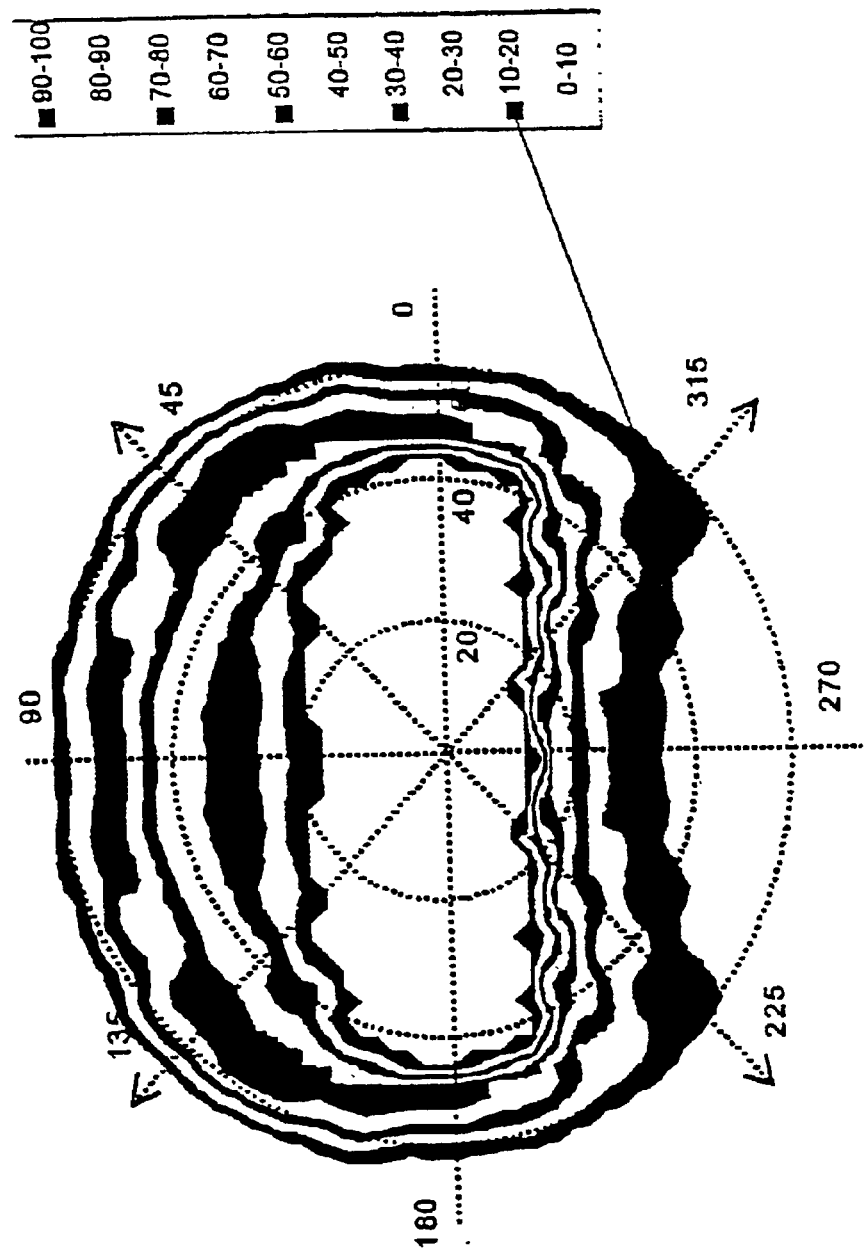
FIGS. 6a, 7a and 8a are isocontrast plots of an inventive compensated TN-LCD device according to example 1–3, respectively.
Figure 6B:
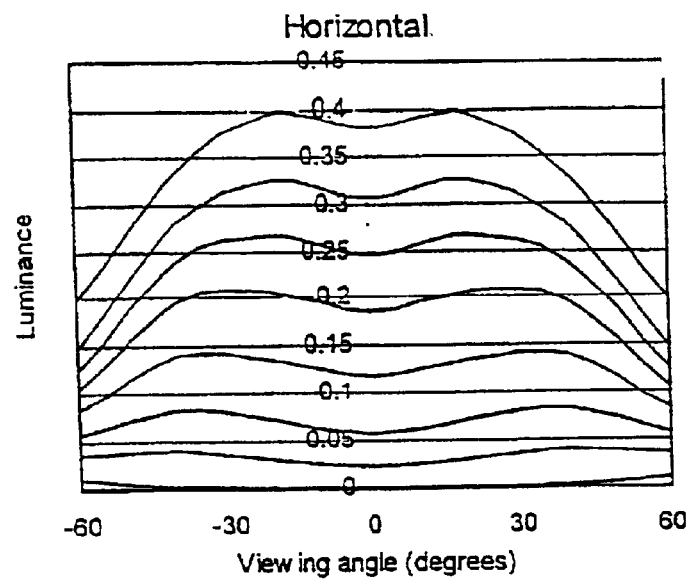
FIGS. 6b, 6c, 7b, 7c, 8b and 8c are grey level diagrams of an inventive compensated TN-LCD device according to example 1–3, respectively, in horizontal (b) and vertical (c) viewing planes.
Figure 6C:
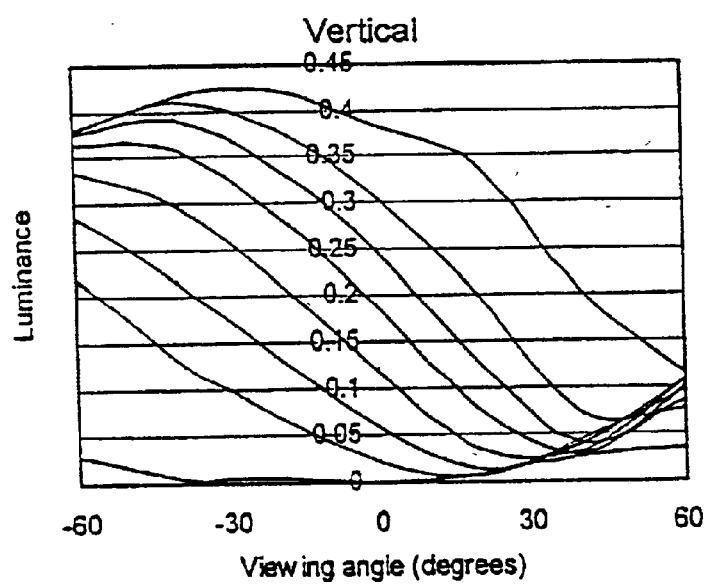

FIG. 6a shows the isocontrast plot of the display, FIGS. 6b and 6c show the grey levels (transmission vesus viewing angle) in horizontal and vertical directions respectively.

In the isocontrast plot FIG. 6a it can be seen that the display has a viewing angle that is significantly larger in horizontal direction, compared to the uncompensated display of example B, and is also slightly improved in vertical direction. In FIGS. 6b and 6c it can be seen that the grey levels 7 and 8 in horizontal direction are significantly improved compared to the uncompensated display of example B, and are also improved in vertical direction at negative angles.

EXAMPLE 2

A compensated TN-LCD device of the E mode according to the present invention comprises the individual components and the stack format as shown in FIG. 2b.

The display according to example 2 relates to a preferred embodiment of the present invention, wherein the O plates 3,3' and the low tilt A plates 4,4' exhibit the same retardation.

In addition, the devices according to example 2 relate to a preferred embodiment, wherein the optical axes 3b,4b of the O plate 3 and the low tilt A plate 4 are twisted clockwise, at an angle+δ, and the optical axes 3b',4b' of the O plate 3' and the low bit A plate 4' are twisted counterclockwise, at an angle−δ, in a plane parallel to the film planes and relative to the optical axes of the other optical elements in the display.

In the device according to example 2 the orientation directions of the optical axes of the polarizers 2,2' are as given in table 3 below, whereas the optical axes 3b and 4b of the O plate 3 and low tilt A plate 4 are oriented at 219° and 129° respectively, and the optical axes 3b' and 4b' of the O plate 3' and low tilt A plate 4' are oriented at 231° and 141°, respectively. Thus, the angle δ in example is ±6

The thickness of the O plates is 1.427 μm.

The thickness of the low tilt A plates is 0.711 μm.

The retardation of the O plates and low tilt A plates is 82 nm.

The other parameters are as given in example 1.

The orientations of the individual components are as given in table 3.

TABLE 3

Orientation direction of the optical axes of individual components in a display according to example 2

| | |
|---|---|
| left polarizer 2 | 315° |
| O plate 3 | 219° |
| low tilt A plate 4 | 129° |
| low tilt A plate 4' | 231° |
| O plate 3' | 141° |
| right polarizer 2' | 45° |

Figure 7A:
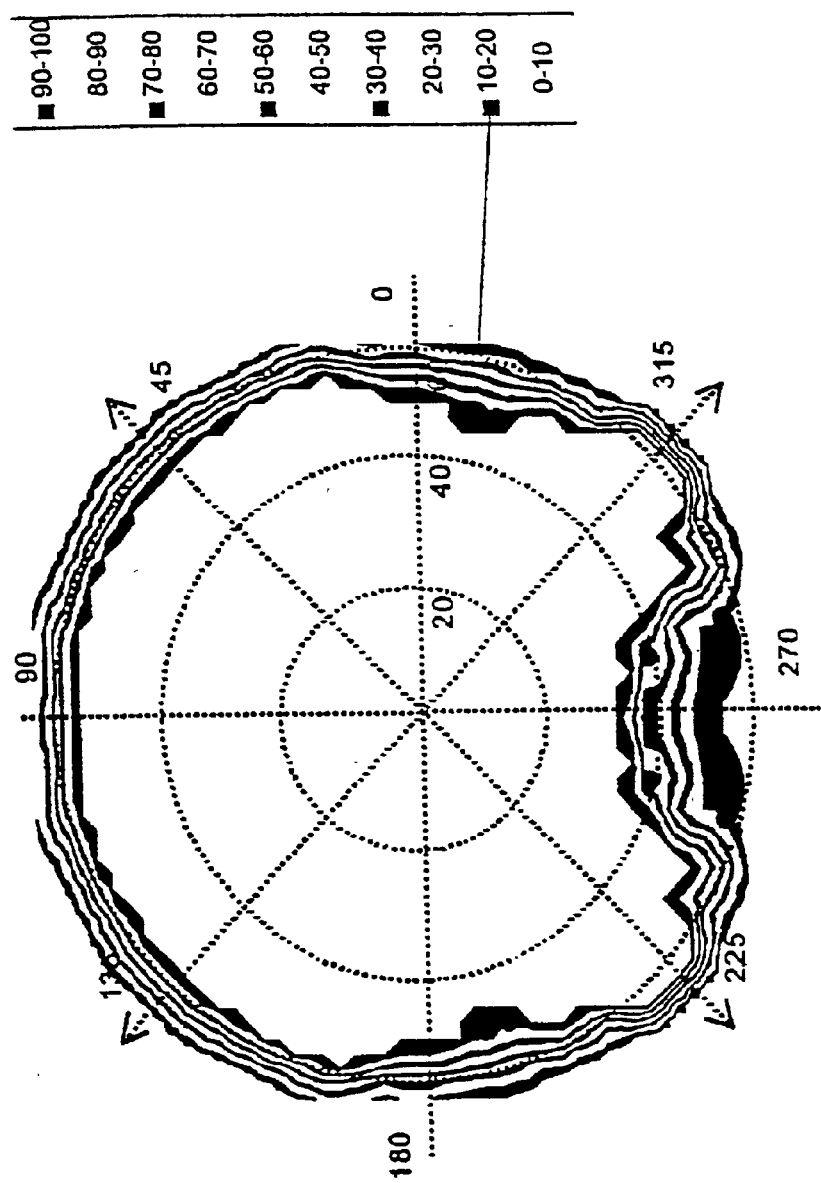
Figure 7B:
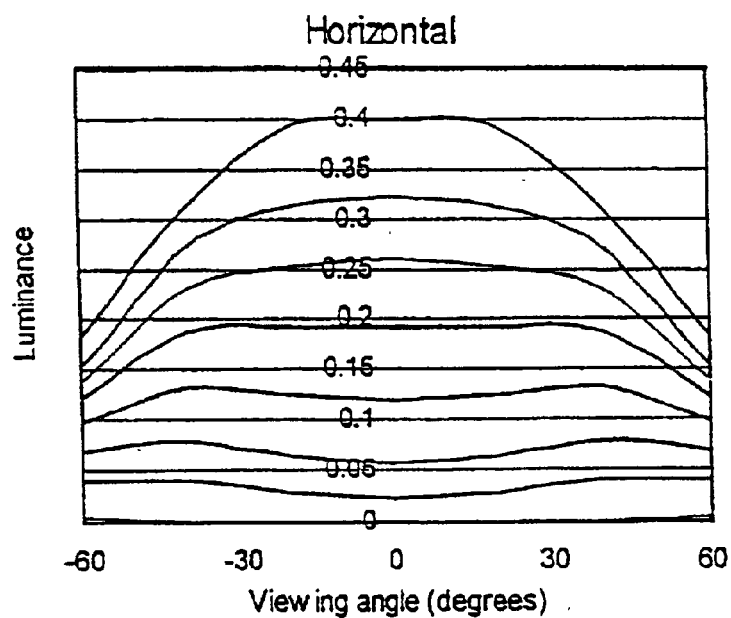
Figure 7C:
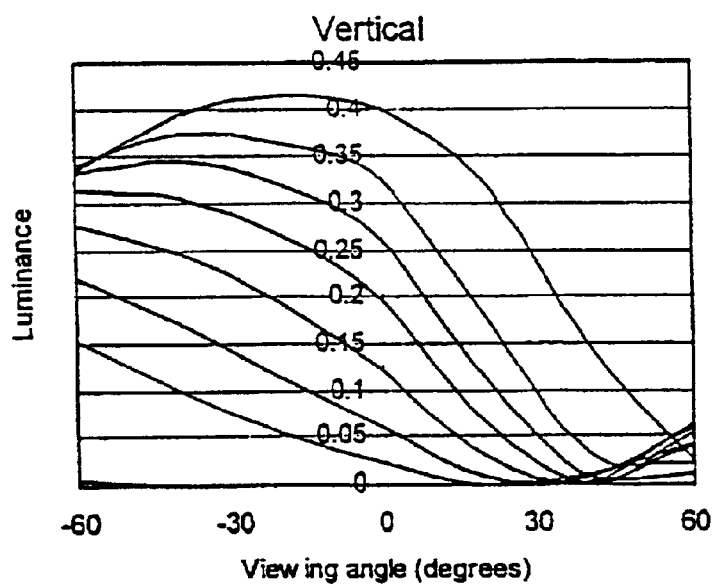

FIG. 7a shows the isocontrast plot of the display, FIG. 7b and 7c show the grey levels in horizontal and vertical directions respectively. It can be seen that, compared to the uncompensated display of example A, the viewing angle is significantly enlarged. The 100-1 isocontrast area is +/−50° in the horizontal direction and +60 to −30°

Figure 8A:
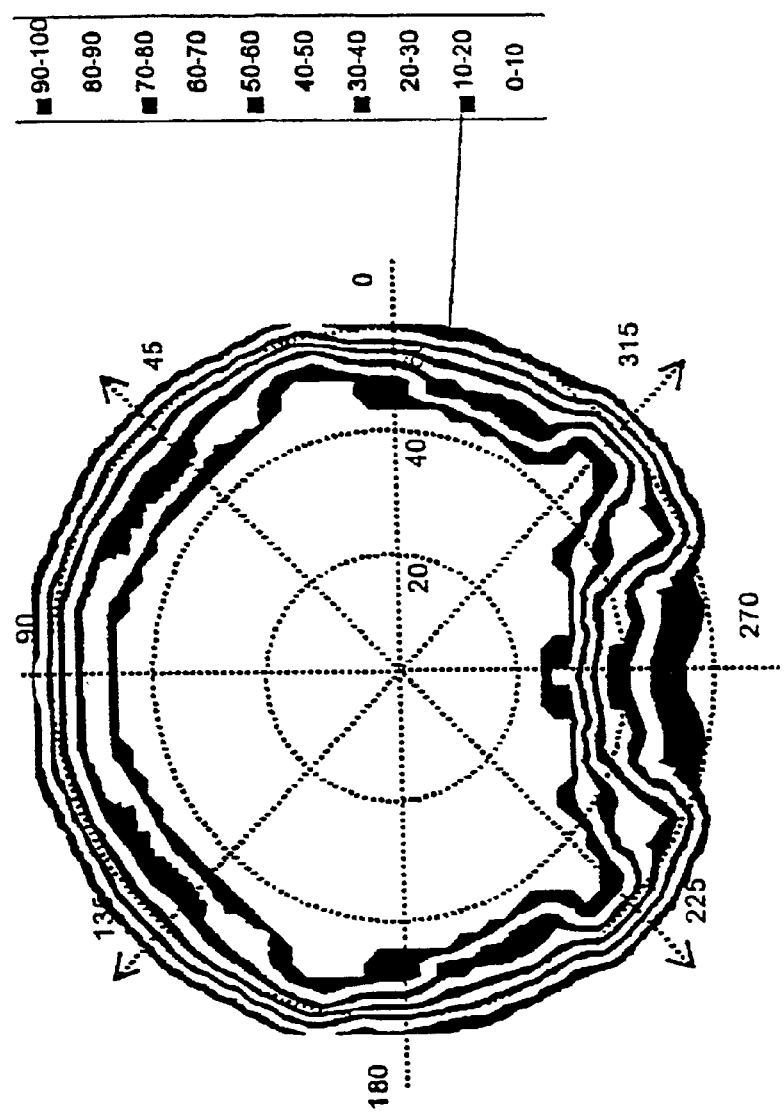
Figure 8B:
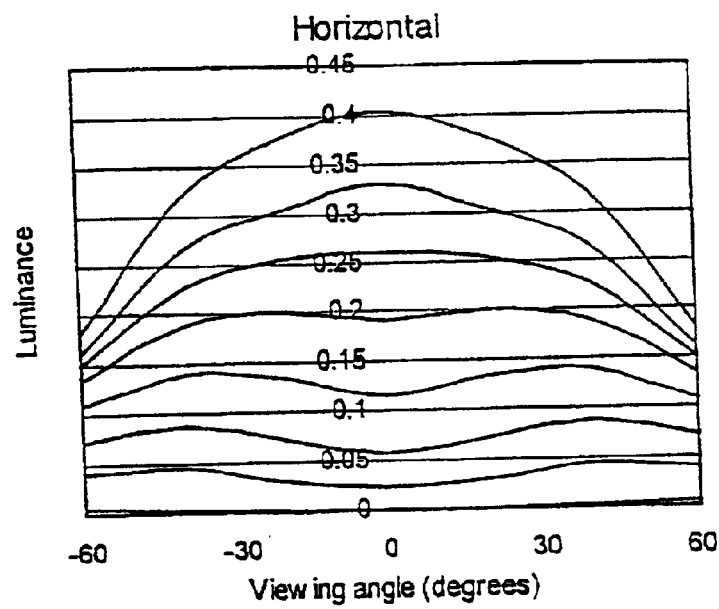
Figure 8C:
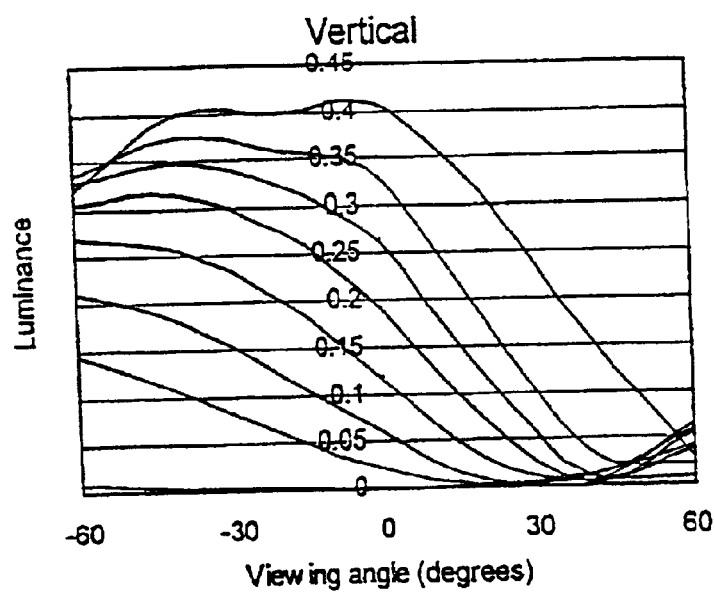

FIG. 8a shows the isocontrast plot of the display, FIGS. 8b and 8c show the grey levels in horizontal and vertical directions respectively. It can be seen that, compared to the uncompensated display of example B, the viewing angle is significantly enlarged. The 100-1 isocontrast area is +/−45° in the horizontal direction and +55°/−25° in the vertical direction. The 10-1 isocontrast area is +/−60° in the horizontal direction and +60/−50° in the vertical direction. The grey levels are improved both in horizontal and vertical direction.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various conditions and usages. in the vertical direction. The 10-1 isocontrast area is +/−60° in the horizontal direction and +60/−50° in the vertical direction. The grey levels are improved both in horizontal and vertical direction.

EXAMPLE 3

A compensated TN-LCD device of the E mode according to the present invention as depicted in FIG. 3 consists of a TN cell 1 with a liquid crystal layer in a twisted nematic state, a pair of linear polarizers 2,2', two splayed O plates 3,3', two low tilt A plates 4,4', two negative C plates 5,5' serving as substrates for the O plates, and two highly twisted A plates 6,6' that have the optical performance of a negative C plate and are situated between O plate 3 and low tilt A plate 4, and between O plate 3' and low tilt A plate 4', respectively. The stack format of the optical components corresponds to type [H] of table 1 above.

In the device according to example 3, the optical axes of the O plates 3,3' and the A plates 4,4' are twisted relative to the other optical components at an angle δ of ±6° as defined above. The orientation of the other components is as given in table 3, example 2.

The parameters of the highly twisted A plates 6,6' are as follows

| | |
|---|---|
| $n_e$ | 1.610 |
| $n_o$ | 1.495 |
| d" | 0.890 μm |
| pitch p | 200 nm |

The average tilt angle $\theta_{ave}$ of the O plates is 45°.

The thickness of the O plates is 1.427 μm.

The thickness of the low tilt A plates is 0.711 μm.

The retardation of the O plates and low tilt A plates is 82 nm.

The other parameters are as given in example 1.

What is claimed is:

1. Optical compensator for liquid crystal displays comprising, stacked films or layers of:

only one O plate retarder, only one low tilt A plate retarder having an average tilt angle, $\theta_{ave}$, of from 1 to 10°, and only two negative C plate retarders.

2. Optical compensator according to claim 1, wherein the average tilt angle, $\theta_{ave}$, in said O plate retarder is from 2 to 88°.

3. Optical compensator according to claim 1, wherein the average tilt angle, $\theta_{ave}$, in said low tilt A plate retarder is from 2 to 6°.

4. Optical compensator according to claim 1, wherein the tilt angle in said O plate retarder varies monotonously in a direction perpendicular to the plane of the film from a minimum value $\theta_{min}$ at one surface of the film to a maximum value $\theta_{max}$ at the opposite surface of the film.

5. Optical compensator according to claim 1, wherein the thickness of said O plate and/or low tilt A plate is from 0.1 to 10 µm.

6. Optical compensator according to claim 1, wherein the optical retardation of said O plate is from 6 to 300 nm.

7. Optical compensator according to claim 1, wherein the optical retardation of said low tile A plate is from 12 to 575 nm.

8. Optical compensator according to claim 1, wherein the O plate comprises a linear or crosslinked polymerized liquid crystalline material with a tilted or splayed structure.

9. Optical compensator according to claim 1, wherein the low tilt A plate comprises a linear or crosslinked polymerized liquid crystalline material with a slightly titled structure.

10. Optical compensator according to claim 1, wherein at least one of the C plates is a negatively birefringent polymer film.

11. Optical compensator according claim 10, wherein said polymer film is a negatively birefringent TAC or DAC film.

12. Optical compensator according to claim 1, wherein at least one C plate comprises a linear or crosslinked polymerized chiral liquid crystalline material with a helically twisted structure.

13. Optical compensator according to claim 12, wherein the helical pitch of the chiral liquid crystalline material in said C plate is less than 250 nm.

14. A liquid crystal display device comprising the following elements a liquid crystal cell formed by two transparent substrates having surfaces which oppose each other, an electrode layer provided on the inside of at least one of said two transparent substrates and optionally superposed with an alignment layer, and a liquid crystal medium which is present between the two transparent substrates, a polarizer arranged outside said transparent substrates, or a pair of polarizers sandwiching said substrates, and at least one optical compensator according to claim 1 being situated between the liquid crystal cell and at least one of said polarizers, it being possible for the above elements to be separated, stacked, mounted on top of each other, coated on top of each other or connected by means of adhesive layers.

15. A liquid crystal display device according to claim 14, which is a TN, HTN or STN display.

16. A liquid crystal display device according to claim 14, wherein, in the optical compensator, the optical axis of the O plate and the low tilt A plate are oriented at right angles to each other.

17. Optical compensator according to claim 1, wherein the average tilt angle, $\theta_{ave}$, in said O plate retarder is from 30 to 60°.

18. Optical compensator according to claim 1, wherein the thickness of said O plate and/or low tilt A plate is from 0.2 to 5 µm.

* * * * *